United States Patent
Helmrich et al.

(10) Patent No.: US 11,363,268 B2
(45) Date of Patent: Jun. 14, 2022

(54) CONCEPT FOR VARYING A CODING QUANTIZATION PARAMETER ACROSS A PICTURE, CODING QUANTIZATION PARAMETER ADJUSTMENT, AND CODING QUANTIZATION PARAMETER ADAPTATION OF A MULTI-CHANNEL PICTURE

(71) Applicant: Fraunhofer-Gesellschaft zur Förderung der angewandten Forschung e.V., Munich (DE)

(72) Inventors: Christian Helmrich, Berlin (DE); Thomas Wiegand, Berlin (DE); Adam Wieckowski, Berlin (DE); Heiko Schwarz, Berlin (DE); Detlev Marpe, Berlin (DE); Sebastian Bosse, Berlin (DE); Benjamin Bross, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/825,533

(22) Filed: Mar. 20, 2020

(65) Prior Publication Data
US 2020/0260083 A1 Aug. 13, 2020

Related U.S. Application Data

(63) Continuation of application No. PCT/EP2018/075528, filed on Sep. 20, 2018.

(30) Foreign Application Priority Data

Sep. 21, 2017 (EP) .................... 17192477
Sep. 21, 2017 (EP) .................... 17192478
Oct. 24, 2017 (EP) .................... 17198164

(51) Int. Cl.
*H04N 19/124* (2014.01)
*H04N 19/176* (2014.01)

(52) U.S. Cl.
CPC ......... *H04N 19/124* (2014.11); *H04N 19/176* (2014.11)

(58) Field of Classification Search
CPC .................... H04N 19/124; H04N 19/176
See application file for complete search history.

(56) References Cited

U.S. PATENT DOCUMENTS 5,631,978 A * 5/1997 Galand ............... H04N 19/105
375/240.11
2002/0191694 A1* 12/2002 Ohyama ................. H04N 1/41
375/240.01
(Continued)

FOREIGN PATENT DOCUMENTS

WO 2008042112 A2 4/2008

OTHER PUBLICATIONS

Wilfried Osberger et al., An MPEG Encoder Incorporating Perceptually Based Quantisation, in Proc. IEEE Annual Conf. Speech & Image Technologies for Comput. & Telecomm., Brisbane, vol. 2, pp. 731-734, 1997.
(Continued)

*Primary Examiner* — Zhubing Ren
(74) *Attorney, Agent, or Firm* — Novick, Kim & Lee, PLLC; Jae Youn Kim; Jihun Kim

(57) ABSTRACT

Coding quantization parameter variation or adaptation is made more effective by basing the determination of a coding quantization parameter for a predetermined block of the picture on a dispersion of a statistical sample value distribution of a high-pass filtered version of the predetermined block. The usage of the high-pass filtered version of the predetermined block as a basis for the determination of the
(Continued)

dispersion instead of using, for instance, the un-filtered or original version of the predetermined block assists in a better adaptation of the resulting coding quantization parameter variation across the picture to the human visual system. Alternatively or additionally, coding quantization parameter variation or adaptation across a picture is made more efficient by a control of coding quantization parameter variation/adaptation across a picture in a manner dependent on a prediction of the actual dispersion. In order to improve the coding efficiency in encoding a picture into a data stream, a comparison between a first coding quantization parameter assigned to a predetermined block of the picture and a threshold which depends on a mean difference of sample values of the predetermined block to sample values' mean value may be performed.

20 Claims, 10 Drawing Sheets

(56) References Cited

U.S. PATENT DOCUMENTS

| | | | | |
|---|---|---|---|---|
| 2008/0123738 | A1* | 5/2008 | Katsavounidis | H04N 19/152 375/240.01 |
| 2010/0098173 | A1* | 4/2010 | Horiuchi | H04N 19/124 375/240.18 |
| 2011/0122942 | A1 | 5/2011 | Kudana et al. | |
| 2013/0223531 | A1* | 8/2013 | Garbas | H04N 19/136 375/240.14 |
| 2018/0324426 | A1* | 11/2018 | Huang | H04N 19/124 |
| 2018/0376143 | A1* | 12/2018 | Andersson | H04N 19/196 |

OTHER PUBLICATIONS

T. Wiegand et al., "Rate-Constrained Coder Control and Comparison of Video Coding Standards," IEEE Trans. Circuits Systems for Video Technology, vol. 13, No. 7, pp. 688-703, Jul. 2003.

V. V. Gohokar et al., "Optimum Bit Allocation Using Human Visual System for Video Compression," in Proc. IEEE Int. Conf. Comput. Intelligence Multim. Applic., Sivakasi, pp. 84-88, Dec. 2007.

C. Yeo et al., "SSIM-Based Adaptive Quantization in HEVC," in Proc. IEEE Int. Conf. Acoustics, Speech, Signal Process., Vancouver, pp. 1690-1694, 2013.

W. W. Chao et al., "Perceptual HEVC/H.265 System with Local Just-Noticeable Difference Model," in Proc. IEEE Int. Symp. Circuits Systems (ISCAS), Montreal, pp. 2679-2682, May 2016.

F. Zhang et al., "HEVC Enhancement using Content-Based Local QP Selection," in Proc. IEEE Int. Conf. Image Process. (ICIP), Phoenix, pp. 4215-4219, Sep. 2016.

Z. Wei et al., "Spatio-Temporal Just Noticeable Distortion Profile for Grey Scale Image/Video in DCT Domain," IEEE Trans. Circuits Systems for Video Technology, vol. 19, No. 3, pp. 337-346, Mar. 2009.

ITU-T, Recommendation H.265 and ISO/IEC, Int. Standard 23008-2, "High efficiency video coding," Geneva, Switzerland, Jan. 2017, online: http://www.itu.int/rec/T-REC-H.265.

S. E. Anderson, "Bit Twiddling Hacks," Stanford University, 2005. http://graphics.stanford.edu/~seander/bithacks.html.

C.-M. Fu et al., "Sample Adaptive Offset in the HEVC Standard," IEEE Trans. Circuits & Syst. for Video Technology, vol. 22, No. 12, pp. 1755-1764, 2012.

C.-Y. Tsai "Adaptive Loop Filtering for Video Coding," IEEE J. Selected Topics in Signal Process., vol. 7, No. 6, pp. 934-945, Dec. 2013.

V. Sze et al.. High Efficiency Video Coding (HEVC)—Algorithms and Architectures, Chem, Switzerland: Springer International Publishing, 2014.

Sullivan G J et al, "The H.264/AVC advanced video coding standard: Overview and introduction to the fidelity range extensions", vol. 5558, No. PART. 1, DOI: 10.1117/12.564457, ISBN: 9781628417302, Jan. 1, 2004 (Jan. 1, 2004), p. 454-474, Visual Communications and Image Processing; Jan. 20, 2004-Jan. 20, 2004; San Jose, Retrieved from the Internet: URL:http://proceedings.spiedigitallibrary.org/proceeding.aspx?articleid=850444, XP002685712.

* cited by examiner

CONCEPT FOR VARYING A CODING QUANTIZATION PARAMETER ACROSS A PICTURE, CODING QUANTIZATION PARAMETER ADJUSTMENT, AND CODING QUANTIZATION PARAMETER ADAPTATION OF A MULTI-CHANNEL PICTURE

CROSS-REFERENCES TO RELATED APPLICATIONS

This application is a continuation of copending International Application No. PCT/EP2018/075528, filed Sep. 20, 2018, which is incorporated herein by reference in its entirety, and additionally claims priority from European Applications Nos. EP 17 192 477.2, filed Sep. 21, 2017, EP 17 192 478.0, filed Sep. 21, 2017 and EP 17 198 164.0, filed Oct. 24, 2017, all of which are incorporated herein by reference in their entirety.

BACKGROUND OF THE INVENTION

The present application is concerned with a concept for varying a coding quantization parameter across a picture such as, for instance, for use in a hybrid video codec, with a coding quantization parameter adjustment, and with coding quantization parameter adaptation of a multi-channel picture.

Perceptual transform coding of still images or videos is known to, for certain input, benefit from visual quantization models adhering to the characteristics of the human visual system (HVS) [1]. Especially in rate-constrained applications where the encoder has to adjust the bit-rate of the coded stream dynamically [2], HVS motivated quantization typically allows to achieve a significantly increased subjective quality of the decoded content compared to objectively optimized quantization based on, e. g., peak signal to noise ratio (PSNR) or mean-square error (MSE) measures. Recently, various subjectively optimized quantization methods have been presented. For example, HVS-based rate control based on [1] for video compression is described in [3], input adaptive quantization optimizing for a structural similarity measure (SSIM) is proposed in [4], a just-noticeable difference model simultaneously considering several psychovisual effects is utilized in [5], and subjectively tuned quantization is derived from a texture mask model in [6].

It is worth emphasizing that the abovementioned solutions tend to increase in algorithmic complexity over the years because their underlying models become more and more elaborate. As a result, their implementations into encoder software involve an increasing amount of computational complexity, which slows down the encoding process. A low-complexity quantizer adaptation method is, thus, desirable.

In other words, it would be desirable to have a possibility at hand in order to control a coding quantization parameter locally across a picture in order adapt same to the picture content in a manner so as to improve or reduce the distortion at a given bitrate, for instance, by allowing for spending a finer quantization for areas of the picture perceptually liable to quantization errors, in favor of areas where the quantization may be made coarser owing the characteristics of the picture content of the latter areas to perceptually hide corresponding quantization errors. Additionally or alternatively, it would be favorable to have a concept at hand which allows for coding quantization parameters setting or control and allows for an easier implementation at comparable coding efficiency or vice versa improved coding efficiency at comparable implementation overhead with the coding efficiency, for instance, being determined in rate distortion sense.

It is, accordingly, according to one aspect, the object of the present application to provide a concept for varying a coding quantization parameter across a picture which enables to obtain a more efficient coding of the picture if using the corresponding coding quantization parameter encoding the picture, according to another aspect, a concept for encoding a picture using a coding quantization parameter which results into a more efficient encoding, and, according to an even further aspect, a concept for coding quantization parameter adaptation across a multi-channel picture which enables to obtain a more efficient coding of the multi-channel picture if using the adapted coding quantization parameters for encoding the picture.

SUMMARY

An embodiment may have an apparatus for varying a coding quantization parameter across a picture, configured to determine a dispersion of a statistical sample value distribution of a high-pass filtered version of a predetermined block of a picture, and determine a coding quantization parameter for the predetermined block depending on the dispersion.

According to another embodiment, an encoder for encoding a picture into a data stream may have: an inventive apparatus for varying a coding quantization parameter across the picture, and an encoding stage configured to encode the picture into the data stream using the coding quantization parameter.

According to another embodiment, a method for varying a coding quantization parameter across a picture may have the steps of: determining a dispersion of a statistical sample value distribution of a high-pass filtered version of a predetermined block of a picture, and determining a coding quantization parameter for the predetermined block depending on the dispersion.

Another embodiment may have a data stream having a picture encoded thereinto by an inventive encoder.

In accordance with a first variant of the first aspect of the present application, coding quantization parameter variation or adaptation is made more effective by basing the determination of a coding quantization parameter for a predetermined block of the picture on a dispersion of a statistical sample value distribution of a high-pass filtered version of the predetermined block. The usage of the high-pass filtered version of the predetermined block as a basis for the determination of the dispersion instead of using, for instance, the un-filtered or original version of the predetermined block assists in a better adaptation of the resulting coding quantization parameter variation across the picture to the human visual system. To be more precise, the high-pass filtering reduces the impact of object edges within the picture (also to be referred to as structural components) onto the determination of the coding quantization parameter or, differently speaking, focuses the responsiveness of the determination of the coding quantization parameter onto the noisy nature of the picture content (also to be referred to as textural components) which assists in perceptually hiding quantization errors.

In accordance with another variant of the first aspect of the present application, which may be combined with the first one or be used separately, coding quantization parameter variation or adaptation across a picture is made more efficient using the following thoughts: The usage of a dispersion of a statistical sample value distribution of a predetermined block of a picture or a filtered version thereof in order to control the coding quantization parameter variation or adaptation across the picture allows for moderate implementation overhead and would thus, in principle, lend itself to control the coding quantization parameter variation/adaptation synchronously at both sides, i.e., encoder and decoder. An insight underlying the second variant of the first aspect of the present application is the fact that the inaccessibility of the dispersion for a block currently to be decoded for the decoder may be bypassed by using a spatially or temporally predicted dispersion at encoder and decoder, respectively, instead, or differently to determine the dispersion offset to the current block within a—in coding order—preceding portion in, for example, a spatial or temporal neighborhood, and use same instead of the dispersion of the actual current block being inaccessible for the decoder. In this regard, another insight of the further variant of the present application is the fact that the determination of a dispersion of a statistical sample value distribution of a certain block is sufficiently independent on being performed on a non-quantized version of the respective block or the quantized or reconstructable version of the block also being available at the decoder side as far as previously coded portions of the picture or the video to which the picture belongs are concerned. These thoughts and insights, in turn, end-up into a control of coding quantization parameter variation/adaptation across a picture in a manner which is still well-adapted to the human visual system although a predicted dispersion is used instead of a locally determined dispersion with enabling the coding quantization parameter variation/adaptation to be made deterministically dependent on previously coded portions so that the variation/adaptation may be synchronized between encoder and decoder and, in turn, any additional signalization overhead with respect to this variation/adaptation may be avoided.

In order to improve the coding efficiency in encoding a picture into a data stream, a comparison between a first coding quantization parameter assigned to a predetermined block of the picture and a threshold which depends on a mean difference of sample values of the predetermined block to sample values' mean value may be performed. This idea may be applied to embodiments of the first aspect and may form a basis of the second aspect. The first coding quantization parameter is a kind of preliminary final version of the coding quantization parameter to be used for the predetermined block and the comparison acts as a kind of final check before actual usage of this coding quantization parameter: If the first coding quantization parameter deviates from the threshold towards a direction of coarser quantization, i.e., if the first quantization parameter results into a quantization step size larger than the threshold, the first coding quantization parameter is adjusted to obtain a second coding quantization parameter associated with a finer quantization than the first coding quantization parameter and the second coding quantization parameter is used in order to encode the picture rather than the first coding quantization parameter. If the first coding quantization parameter deviates from the threshold opposite to the direction of coarser quantization, the first coding quantization parameter may, for instance, be maintained and used to encode the picture. By using this final check the mechanism used to assign the first coding quantization parameter to the predetermined block of the picture may be designed in a manner which more aggressively tries to keep the quantization as coarse as possible because the final check avoids a too coarse quantization at blocks for which the coarseness would be exaggerated. The assignment of the first coding quantization parameter, in turn, may be made in any manner wherein some embodiments are described in the present application.

The second aspect may be combined with the embodiments related to the first aspect. That is, coding quantization parameter variation or adaptation may be made more effective by basing the determination of a coding quantization parameter for a predetermined block of the picture on a dispersion of a statistical sample value distribution of a high-pass filtered version of the predetermined block. The usage of the high-pass filtered version of the predetermined block as a basis for the determination of the dispersion instead of using, for instance, the un-filtered or original version of the predetermined block assists in a better adaptation of the resulting coding quantization parameter variation across the picture to the human visual system. To be more precise, the high-pass filtering reduces the impact of object edges within the picture (also to be referred to as structural components) onto the determination of the coding quantization parameter or, differently speaking, focuses the responsiveness of the determination of the coding quantization parameter onto the noisy nature of the picture content (also to be referred to as textural components) which assists in perceptually hiding quantization errors.

Further, coding quantization parameter variation or adaptation across a picture may be made more efficient using the following thoughts: The usage of a dispersion of a statistical sample value distribution of a predetermined block of a picture or a filtered version thereof in order to control the coding quantization parameter variation or adaptation across the picture allows for moderate implementation overhead and would thus, in principle, lend itself to control the coding quantization parameter variation/adaptation synchronously at both sides, i.e., encoder and decoder. An insight is, as outlined above, the fact that the inaccessibility of the dispersion for a block currently to be decoded for the decoder may be bypassed by using a spatially or temporally predicted dispersion at encoder and decoder, respectively, instead, or differently to determine the dispersion offset to the current block within a—in coding order—preceding portion in, for example, a spatial or temporal neighborhood, and use same instead of the dispersion of the actual current block being inaccessible for the decoder. In this regard, another insight is, as outlined above, the fact that the determination of a dispersion of a statistical sample value distribution of a certain block is sufficiently independent on being performed on a non-quantized version of the respective block or the quantized or reconstructable version of the block also being available at the decoder side as far as previously coded portions of the picture or the video to which the picture belongs are concerned. These thoughts and insights, in turn, end-up into a control of coding quantization parameter variation/adaptation across a picture in a manner which is still well-adapted to the human visual system although a predicted dispersion is used instead of a locally determined dispersion with enabling the coding quantization parameter variation/adaptation to be made deterministically dependent on previously coded portions so that the variation/adaptation may be synchronized between encoder and decoder and, in turn, any additional signalization overhead with respect to this variation/adaptation may be avoided.

In accordance with the third aspect, the present application is based on the finding that rendering coding quantization parameter adaptation dependent on an evaluation of samples enables to render multi-channel encoding more efficient in terms of complexity and/or may relax the side information overhead in conveying information on the coding quantization parameter such that it is leads to an efficiency increase when coding a multi-channel picture and applying the coding quantization parameter adaptation channel-specifically.

The third aspect is also combinable with the embodiments of the first aspect. For example, coding quantization parameter adaptation may be made by evaluating the sample activity. A dispersion of a statistical sample value distribution of a non-filtered or a high-pass filtered version of the predetermined block may be used. The usage of the high-pass filtered version of the predetermined block as a basis for the determination of the dispersion instead of using, for instance, the un-filtered or original version of the predetermined block may lead to a better adaptation of the resulting coding quantization parameter variation across the picture to the human visual system. To be more precise, the high-pass filtering reduces the impact of object edges within the picture (also to be referred to as structural components) onto the determination of the coding quantization parameter or, differently speaking, focuses the responsiveness of the determination of the coding quantization parameter onto the noisy nature of the picture content (also to be referred to as textural components) which assists in perceptually hiding quantization errors. When so done for each channel, the resulting coding quantization parameters derived from the activity measured in high-pass filtered domain results into efficient coding of each channel thereby leading to increased coding efficiency of a multi-channel picture.

Further, when rendering coding quantization parameter adaptation across a picture dependent on a channel-wise evaluation of the sample activity, the multi-channel coding may be rendered more efficient based on the following thoughts: The usage of a dispersion of a statistical sample value distribution of a predetermined block of a picture or a filtered version thereof in order to control the coding quantization parameter variation or adaptation across the picture allows for moderate implementation overhead and would thus, in principle, lend itself to control the coding quantization parameter variation/adaptation synchronously at both sides, i.e., encoder and decoder. The inaccessibility of the dispersion for a block currently to be decoded for the decoder may be bypassed by using a spatially or temporally predicted dispersion at encoder and decoder, respectively, instead, or differently to determine the dispersion offset to the current block within a—in coding order—preceding portion in, for example, a spatial or temporal neighborhood, and use same instead of the dispersion of the actual current block being inaccessible for the decoder. Favorably, the determination of a dispersion of a statistical sample value distribution of a certain block is sufficiently independent on being performed on a non-quantized version of the respective block or the quantized or reconstructable version of the block also being available at the decoder side as far as previously coded portions of the picture or the video to which the picture belongs are concerned. These thoughts and insights, in turn, end-up into a control of coding quantization parameter variation/adaptation across a picture in a manner which is still well-adapted to the human visual system although a predicted dispersion is used instead of a locally determined dispersion with enabling the coding quantization parameter variation/adaptation to be made deterministically dependent on previously coded portions so that the variation/adaptation may be synchronized between encoder and decoder and, in turn, any additional signalization overhead with respect to this variation/adaptation may be avoided. Using this control channel-individually enables a highly efficient multi-channel picture coding.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
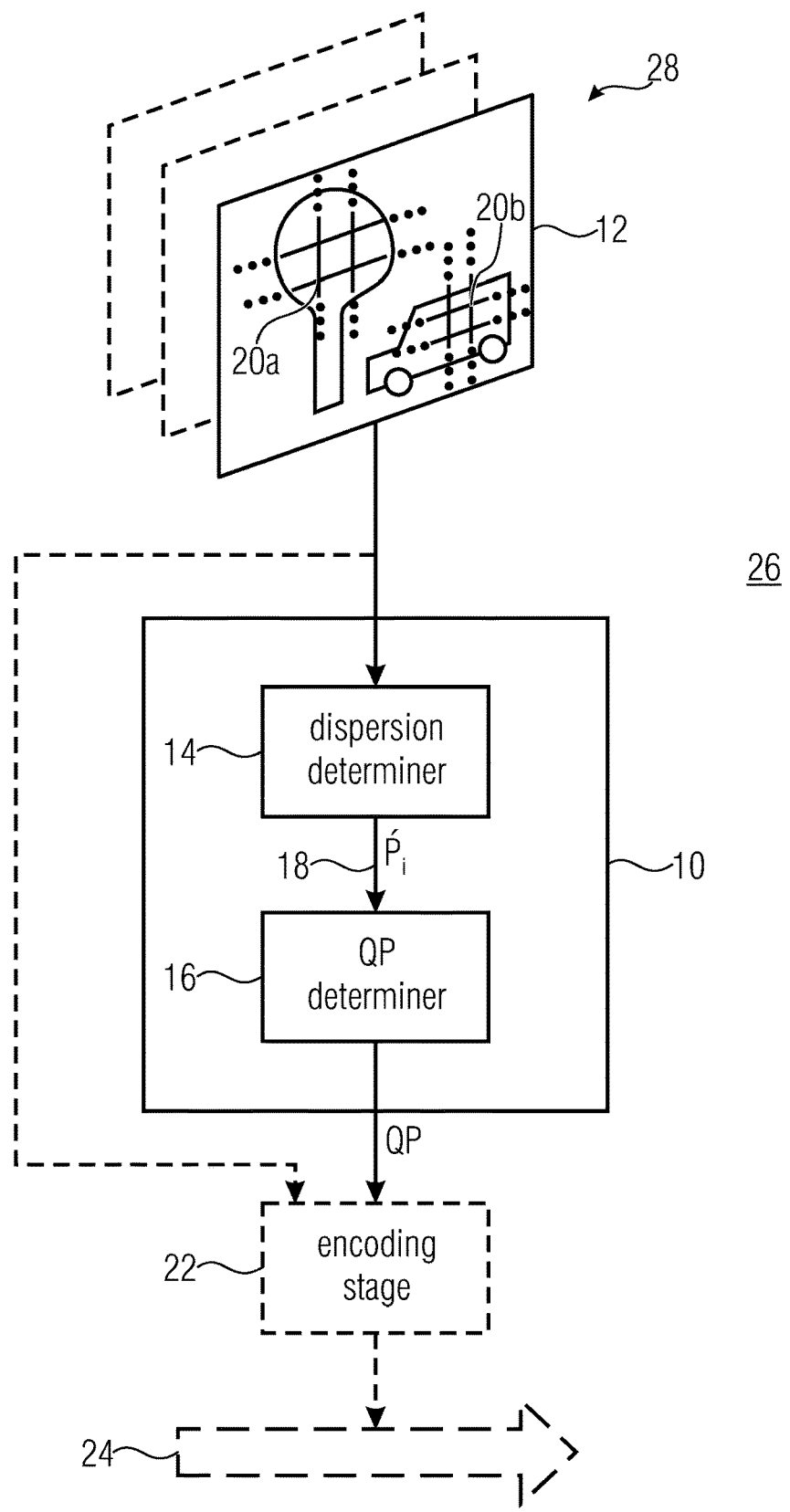
FIG. 1 shows a schematic block diagram of an apparatus for varying a coding quantization parameter and a possible combination thereof with an encoding stage to yield an encoder to exemplify the possibility of using the dispersion of sample values of a high-pass filtered version of a current block so as to determine or adjust the quantization parameter.

In the following, various embodiments for varying or adjusting a coding quantization parameter are described. These embodiments use at least one of the aspects highlighted above or a combination thereof. Before discussing these embodiments, however, some thoughts shall be presented here which led to the aspects which the embodiments described later on make use of. In particular, it has been noticed that, of the psychovisual effects commonly exploited in the literature, namely, frequency sensitivity, defined by a contrast sensitivity function, spatiotemporal masking effects, especially luminance masking, higher-level perceptual factors like attention or eye movement, only the second category is viewer and environment invariant. To be precise, the frequency or contrast sensitivity depends on factors such as the viewing distance to, and resolution of, the display depicting the decoded image or video, and higher-level HVS factors highly depend on the picture region the observer is looking at [1] (humans only possess high visual acuity over a small viewing area called the fovea). In practice, a viewer is often given control over the video playback speed—up to the point of pausing the video or taking still snapshots of certain frames—and can look at the image or video repeatedly and focus on any spatial (or temporal) region thereof. Hence, it can be concluded that such HVS characteristics cannot be exploited reliably in an image or video encoder.

Given the introduced requirements of low computational complexity and high viewer and environment invariance in a visually optimized quantization approach the embodiments described hereinafter seek to enable simple implementations thereof. In particular, some embodiments for coding quantization parameter variation/adaptation use an aspect according to which same is performed in a manner dependent on a dispersion of a statistical sample value distribution of a high-pass filtered version of a predetermined block. A block-wise determined measure is used in [1] and its extension described in [7], where both are luminance based, i.e., do not incorporate any available chrominance channels into the analysis. Owing to the determination of the dispersion measure on the basis of the high-pass filtered version, some embodiments described hereinafter result into improved coding efficiency and/or lower implementation overhead. For instance, unlike the approaches of [1] and [7] which involve regional classifications of each picture into either smooth/flat, edge, or texture blocks, the embodiments of the present application avoid such classification or render it superfluous. Some of these embodiments or other embodiments of the present application avoid an overhead for controlling the coding quantization parameter variation/adaptation by using a predicted dispersion instead of a locally determined dispersion measure, thereby lowering the coding rate at improved adaptation to the human visual system. Even further ones of these embodiments or other embodiments described hereinafter use a kind of suitability check for a coding quantization parameter by comparing the exceeding or succeeding a certain threshold to determine whether the coding quantization parameter preliminary assigned to a certain predetermined block results into a too coarse quantization in which even the coding quantization parameter is adjusted to render the quantization finer.

In the following, an embodiment of the present application is described which performs coding quantization parameter variation/adaptation across a picture in a manner dependent on a dispersion of a statistical sample value distribution of a high-pass filtered version. This embodiment is exemplified as a possible modification of the HEVC codec by way of concrete examples for the high-pass filtering, for instance, the dependency of the coding quantization parameter of the thus-determined dispersion, the dispersion measure itself and/or the relationship between the coding quantization parameter and the quantization step-size parametrized thereby, but it is clear that all these details may likewise be applied to any other video or picture codec. Accordingly, at the end of this description, there follows a presentation of embodiments which transfer this specific embodiment onto a less specific coding environment.

With respect to the third aspect with respect to which embodiments are subsequently described which perform coding quantization parameter variation/adaptation across a multi-channel picture channel-individually such as for luma separately as done for chroma, by evaluating, separately, samples of the respective channel with the activity possibly being used as a basis, and with possibly using any dispersion measure to measure the activity, description brought forward below first, explains the underlying concepts without consideration of the juxta-position of channels. Rather the QP adaptation functionality is firstly described for mono-channel environments. That is, with respect to the third aspect, the just following description represents comparison examples. And in doing so, i.e. in providing comparison examples, the explanation starts with encoder only related aspects, whereinafter QP adaptation functionalities are described which are applicable to encoder and decoder and may be used to substitute, at least partially, any side information overhead in synchronizing QP adaptation between encoder and encoder. Performing coding quantization parameter variation/adaptation across a picture in a manner dependent on a dispersion of a statistical sample value distribution of a high-pass filtered version is exemplified in the following as a possible modification of the HEVC codec by way of concrete examples for the high-pass filtering, for instance, the dependency of the coding quantization parameter of the thus-determined dispersion, the dispersion measure itself and/or the relationship between the coding quantization parameter and the quantization step-size parametrized thereby, but it is clear that all these details may likewise be applied to any other video or picture codec. As already stated, at the end of this description, there follows a presentation of embodiments which transfer this specific embodiment onto a less specific coding environment.

All contemporary perceptual image and video transform coders apply a quantization parameter (QP) for rate control which, in the encoder, is employed as a divisor to normalize the transform coefficients prior to their quantization and, in the decoder, to scale the quantized coefficient values for reconstruction. In High Efficiency Video Coding (HEVC) as specified in [8], the QP value is coded either once per image or once per N×N block, with N=8, 16, 32, or 64, on a logarithmic scale with a step-size of roughly one dB:

$$\text{Encoder: } q=\text{round}(6\log_2(QP)+4), \text{Decoder: } QP'=2^{(q-4)/6}, \quad (1)$$

where q is the coded QP index and ' indicates the reconstruction. Notice that QP' is also utilized in the encoder-side normalization to avoid any error propagation effects due to the QP quantization. The present embodiment adjusts the QP locally for each 64×64-sized coding tree unit (CTU, i. e., N=64) in case of images and videos with a resolution equal to or less than Full High Definition (FHD, 1920×1080 pixels), or for each 64×64 or 128×128-sized block in case of greater-than-FHD resolution (e. g., 3840×2160 pixels). For each of these block units, two spatially filtered variants of the picture's luminance (luma, Y) components are derived as follows:

$$\acute{p}(x,y)=4p(x,y)-p(x-1,y)-p(x,y-1)-p(x+1,y)-p(x,y+1), \quad (2)$$

$$\grave{p}(x,y)=4_p(x,y)+p(x-1,y)+p(x,y-1)+p(x+1,y)+p(x,y+1)- 8\mu=8p(x,y)-\acute{p}(x,y)-8\mu, \quad (3)$$

with $\mu=\Sigma_{x,y\in b}\, p(x,y)/N^2$ being the average DC component of the given N×N-sized block b and x, y representing the horizontal and vertical coordinates, respectively, of each luma pixel p inside said block, i. e., x, y∈b. Then, from both the high-pass filtered pixels $\acute{p}(x,y)$ in (2) and the DC compensated (zero-mean) low-pass pixels $\grave{p}(x,y)$ in (3), the block-wide normalized $L_1$ or $L_2$ norm is obtained:

$$L_1 \text{ norm: } \acute{P}_1=\Sigma_{x,y\in b}|\acute{p}(x,y)|/N^2, \grave{P}_1=\Sigma_{x,y\in b}|\grave{p}(x,y)|/N^2,$$

or $$L_2 \text{ norm: } \acute{P}_2=\sqrt{(\Sigma_{x,y\in b}|\acute{p}(x,y)|/N^2)}, \grave{P}_1=\sqrt{(\Sigma_{x,y\in b}|\grave{p}(x,y)|/N^2)}, \quad (4)$$

The squares of these $L_1$ or $L_2$ norms are averaged across the entire picture (or slice, in case of HEVC), which for the $L_2$ norm implies that said square cancels the square-root in (4). In a FHD picture, 510 per-b $\acute{P}_{1 \text{ or } 2}$ and $\grave{P}_{1 \text{ or } 2}$ values, abbreviated as $\acute{P}$ and $\grave{P}$ hereafter (hence dropping the subscripts), are averaged when N=64. Using $$L(\cdot)=\lceil c \log_2(\cdot) \rceil \text{ with, advantageously, constant } c=2 \text{ in HEVC} \quad (5)$$

for logarithmic conversion, which can be implemented efficiently using table look-ups (see, e. g., [9] for a general algorithm), a QP offset $-q<o_b\leq 51-q$ for each block b can, finally, be determined:

$$o_b=[a(L(\acute{P}_b^2)-L(\text{avg}(\acute{P}^2)))+(1-a)(L(\grave{P}_b^2)-L(\text{avg}(\grave{P}^2)))], \quad (6)$$

with a=¼. In HEVC, this CTU-wise offset is added to the default slice-wise QP index q, and QP' for each CTU is obtained from (1).

Note that, to slightly reduce the delta-QP side-information rate, it was found to be advantageous to apply two-dimensional median filtering to the resulting matrix of $q+o_b$ sums transmitted to the decoder as part of the coded bit-stream. In the embodiment, a three-tap cross-shaped kernel, i. e., a filter computing the median for a value from that value and its immediate vertical and horizontal neighbors, similar to the high-pass filter of (1), is used. Moreover, in each CTU, the rate-distortion parameter $\lambda_b$ needs to be updated according to q+ob to maximize the coding efficiency $$\lambda'_b=\lambda_b\cdot 2^{ob/3} \text{ or, when median filtering, } \lambda_b\cdot 2^{(\text{median}(q+o_b)-q)/3}. \quad (7)$$

In [1], edge blocks were classified into a separate category and quantized using dedicated custom parameters in order to prevent a noticeable increase in quantization-induced ringing effects around straight directional lines or object borders. When using the current embodiment in the context of HEVC, no such effects can be observed even though no comparable classification is performed. The most likely reason for this property is the increased efficiency of HEVC over the MPEG-2 standard used in [1] with regard to edge coding. Most notably, HEVC supports smaller 4×4 blocks, with optional transform skipping for quantization directly in the spatial domain, as well as a Shape Adaptive Offset (SAO) post-filtering operation to reduce banding and ringing effects during decoding [8, 10].

Thanks to the incorporation of the picture-averaged avg ($\acute{P}^2$) and avg($\grave{P}^2$) in (6), the average coding bit-rate, when measured across a diverse set of input material, does not increase significantly due to the application of the QP adaptation proposal. In fact, for q=37 and similar nearby values, the mean bit-stream rate was found not to change at all when employing the QP adaptation. This property can, therefore, be regarded as a second advantage of the present embodiment, aside from its aforementioned low computational complexity.

It should be emphasized that the present embodiment can easily be extended to non-square coding blocks. As should be evident to those skilled in the art, unequal horizontal and vertical block/CTU sizes can be accounted for in (2-4) by replacing all occurrences of (here: divisions by) $N^2$ with (divisions by) $N_1 \cdot N_2$, where the subscripts 1 and 2 denote the horizontal and vertical block dimensions.

After having described first embodiments using a dispersion of a statistical sample value distribution of a high-pass filtered version of a block to control the coding quantization parameter for this block, a corresponding embodiment is described in the following with respect to FIG. 1 which shows an apparatus for varying or adapting a coding quantization parameter across a picture and its possible applicability in an encoder for encoding a picture, but this time the details presented above are generalized and although the embodiment of FIG. 1 may be implemented as a modification of a HEVC codec as it has been the case above, this needs not to be necessarily the case as outlined in more detail below.

FIG. 1 shows the apparatus 10 for varying the coding quantization parameters QP across a picture 12 as comprising a dispersion determiner 14 and a QP determiner 16. The dispersion determiner determines a dispersion of a statistical sample value distribution of a high-pass filtered version of a predetermined block of picture 12. The dispersion determiner 14 computes the dispersion, for instance, using the above-mentioned equation 4, i.e., may use a $L_p$ norm with p≥1. Further, as also discussed above, the dispersion determiner 14 may subject the predetermined block to the high-pass filtering first followed by the determination of the dispersion 18 by computing a dispersion of a statistical distribution of the thus high-pass filtered sample values. The high-pass filtering may be performed using an FIR filter such as, for instance, according to equation 2 where each high-pass filtered sample value x, y is a sum, or depends on a sum, of the co-located sample value ($p_{x,y}$) times a first weight in sample values especially neighboring the respective sample value times second weights differing in sign to the first weight. Although a cross-shaped filter kernel, i.e., the respective filtered sample position and for surrounding neighboring sample positions, is used according to equation 2, the high-pass filtering may, naturally, be embodied differently. Likewise, the weights, i.e., 4 and −1, according to equation 2 may be selected differently, too. As far as the dispersion is concerned, dispersion determiner 14 may use a $L_p$ norm where p=1 or p=2 to measure the dispersion, as done according to equation 4, but dispersion determiner 14 may alternatively use other measures of dispersion such as the interquartile range or any other $L_p$ norm suitably measuring the dispersion, i.e., the scatter or spread of the sample values within the predetermined block.

The QP determiner 16 receives the dispersion 18 and, depending thereon, determines the quantization parameter QP. As described above, the QP determiner 16 may subject the dispersion received from dispersion determiner 14 to logarithmization such as indicated in equation 5 although any other transition to logarithmic domain may be used alternatively.

In addition to the just-discussed high-pass filter domain dispersion, dispersion determiner 14 may further determine a further dispersion of a statistical sample value distribution of a low-pass filtered version of the predetermined block with the QP determiner 16 performing the determination of QP further depending on the latter dispersion. For instance, the low-pass filtering may be performed using an FIR filter and in particular using, for instance, the equation 3 discussed above although different ratings of the summation of the sample values within the filter kernel or a differently shaped filter kernel may be used alternatively. As to the actual dispersion measure used, the same as discussed above with respect to the high-pass filter domain dispersion applies, i.e., a $L_p$ norm with p≥1 may be used, for instance, or any other dispersion measure. The QP determiner 16 may apply a logarithmization to the low-pass filter domain dispersion and QP determiner 16 may form a weighted sum between both dispersions in order to obtain the quantization parameter such as equation 6. The determination by QP determiner 16 may also involve a rounding or a quantization as indicated in equation 6, i.e., a rounding of the dispersion in logarithmic domain, for instance.

The mode of operation of dispersion determiner 14 and QP determiner 16 has been discussed above with respect to a certain predetermined block of picture 12. Such a predetermined block is exemplarily indicated in FIG. 1 at 20a, for instance. In the manner just-outlined, determiner 14 and determiner 16 act on each of a plurality of blocks picture 12 is composed of, thereby achieving the QP variation/adaption across picture 12, i.e., the adaptation of the quantization parameter QP to the picture content so as to be adapted to the human visual system, for instance.

Due to this adaptation, the resulting quantization parameter may advantageously be used by an encoding stage 22 receiving the corresponding quantization parameter QP in order to encode the corresponding block of picture 12 into a data stream 24. Accordingly, FIG. 1 exemplary shows as to how apparatus 10 may be combined with an encoding stage 22 so as to result into an encoder 26. The encoding stage 22 encodes picture 12 into a data stream 24 and uses, to this end, the quantization parameter QP varied/adapted by apparatus 10 across picture 12. That is, within each block, which picture 12 is composed of, encoding stage 22 uses the quantization parameter as determined by QP determiner 16.

For sake of completeness, it should be noted that the quantization parameter used by encoding stage 22 to encode picture 12 may not solely be determined by QP determiner 16. Some rate control of encoding stage 22, for instance, may cooperate to determine the quantization parameter such as, for instance, by determining $QP_q$ while the contribution by QP determiner 16 may end-up into QP offset $O_b$. As shown in FIG. 1, encoding stage 22 may, for instance, code the quantization parameter into data stream 24. As described above, a quantization parameter may be coded into data stream 24 for the corresponding block such as block 20a in logarithmic domain. The encoding stage 22, in turn, may apply the quantization parameter in the non-logarithmic domain, namely in order to normalize the signal to be coded into data stream 24 by using the quantization parameter in non-logarithmic or linear domain as a divisor applied to the respective signal. By this measure, the quantization noise resulting from the quantization by encoding stage 22 is controlled across picture 12.

The encoding of the quantization parameter into the data stream 24 may, as discussed above, be made as differences to a base quantization parameter of larger scope globally determined, for instance, for picture 12 or slices thereof, i.e., in form of offsets $O_b$ and the coding may involve entropy coding and/or differential or predictive coding, merging or similar concepts.

Owing to the fact that the dispersion 18 is determined for a high-pass filtered version of a block, the dispersion 18 is well-suited to adapt the quantization parameter to the HVS. Block 20a of FIG. 1, for instance, is illustrated as covering picture content of picture 12 relating a treetop. Owing to the leaves of the tree, the dispersion will be relatively high. This dispersion may, thus, be used to set the quantization QP relatively high for this block as the non-smooth or non-flat leaf texture of the tree hides for the human eye any coding error owing to quantization errors. FIG. 1 representatively shows another block 20b, this time relating to the side of a van which might be monochrome or at least large monochrome areas (i.e. has a smooth or flat texture). Here, the dispersion will be relatively low and in fact, quantization errors might here be liable to perception. Even if block 20b crosses an edge of one monochrome area to another (i.e. contains structural components), then the high-pass filter domain within which the dispersion 18 is determined results in dispersion 18 being relatively low so that, still, coding errors may be avoided here.

Figure 2:
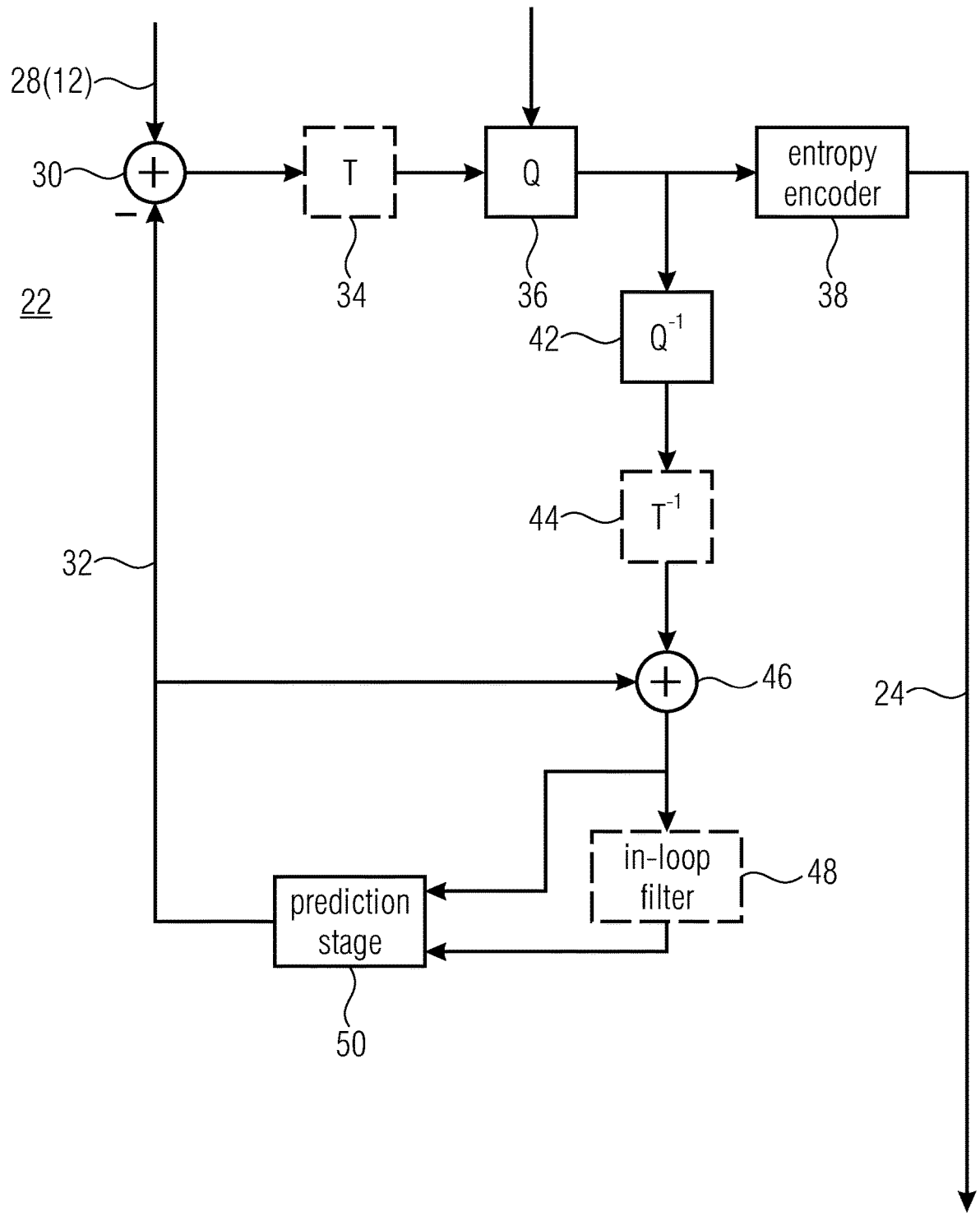
FIG. 2 shows a block diagram of an example for the internal structure of an encoding stage occurring in other figures.

For sake of completeness, FIG. 2 shows a possible structure of encoding stage 22. In particular, FIG. 1 relates to the case where encoder 26 of FIG. 1 is a video coder with picture 12 being one picture out of a video 28. Here, the encoding stage 22 uses hybrid video coding. Encoding stage 22 of FIG. 2 comprises a subtractor 30 to subtract a prediction signal 32 from the signal to be coded, such as picture 12. In a concatenation of an optional transform stage 34, a quantizer 36 and entropy coder 38 are connected in the order of their mentioning to the output of subtractor 30. Transformation stage 34 is optional and may apply a transformation, such as s spectrally decomposing transformation, onto the residual signal output by subtractor 30 and quantizer 36 quantizes the residual signal in transform domain or in spatial domain on the basis of the quantization parameter as varied or adapted by apparatus 10. The thus quantized residual signal is entropy encoded into the data stream 24 by entropy encoder 38. A concatenation of a dequantizer 42 followed by an optional inverse transformer 44 reverses or performs the inverse of the transform and quantization of modules 34 and 36 so as to reconstruct the residual signal as output by subtractor 30 except for the quantization errors occurring owing to the quantization by quantizer 36. An adder 46 adds the reconstructed residual signal and the prediction signal 32 to result into a reconstructed signal. An in-loop filter 48 may optionally be present in order to improve the quality of completely reconstructed pictures. A prediction stage 50 receives reconstructed signal portions, i.e., already reconstructed portions of a current picture and/or already reconstructed previously coded pictures, and outputs the prediction signal 32.

FIG. 2, thus, renders clear that the quantization parameter as varied or adapted by apparatus 10 may be used in the encoding stage 22 so as to quantize a prediction residual signal. The prediction stage 50 may support different prediction modes such as an intra prediction mode according to which prediction blocks are spatially predicted from already coded portions, and an inter prediction mode according to which a prediction block is predicted on the basis of already coded pictures such as a motion-compensative prediction mode. It should be noted that the encoding stage 22 may support switching on/off the residual transform by transformation stage 34 and the corresponding inverse transformation by inverse transformer 44 in units of residual blocks, for instance.

And further, it should be noted that the block granularities mentioned may differ: the blocks at which the prediction mode is varied, the blocks at which prediction parameters for controlling the respective prediction mode are set and transmitted in data stream 24, the blocks at which transformation stage 34 performs individual spectral transforms, for instance, and finally, the blocks 20a and 20b at which the quantization parameter is varied or adapted by apparatus 10 may mutually differ or at least some may differ mutually. For instance, and as exemplified in the above example with respect to HEVC, the sizes of blocks 20a and 20b at which the quantization parameter variation/adaptation by apparatus 10 is performed, may be more than four times larger than a smallest block size at which the transforms by transformation stage 34 are performed when the spectral transform may, for instance, be a DCT, DST, KLT, FFT or a Hadamard transform. It may alternatively even be larger than eight times the minimum transform block size. As indicated above, the in-loop filter 48 may be an SAO filter [10]. Alternatively, an ALF filter may be used [11]. Filter coefficients of the in-loop filter may be coded into data stream 24.

Finally, as has already been indicated above, the QPs as output by apparatus 10 may be coded into the data stream in a manner having passed some two-dimensional median filtering so as to lower the data rate needed.

Figure 3:
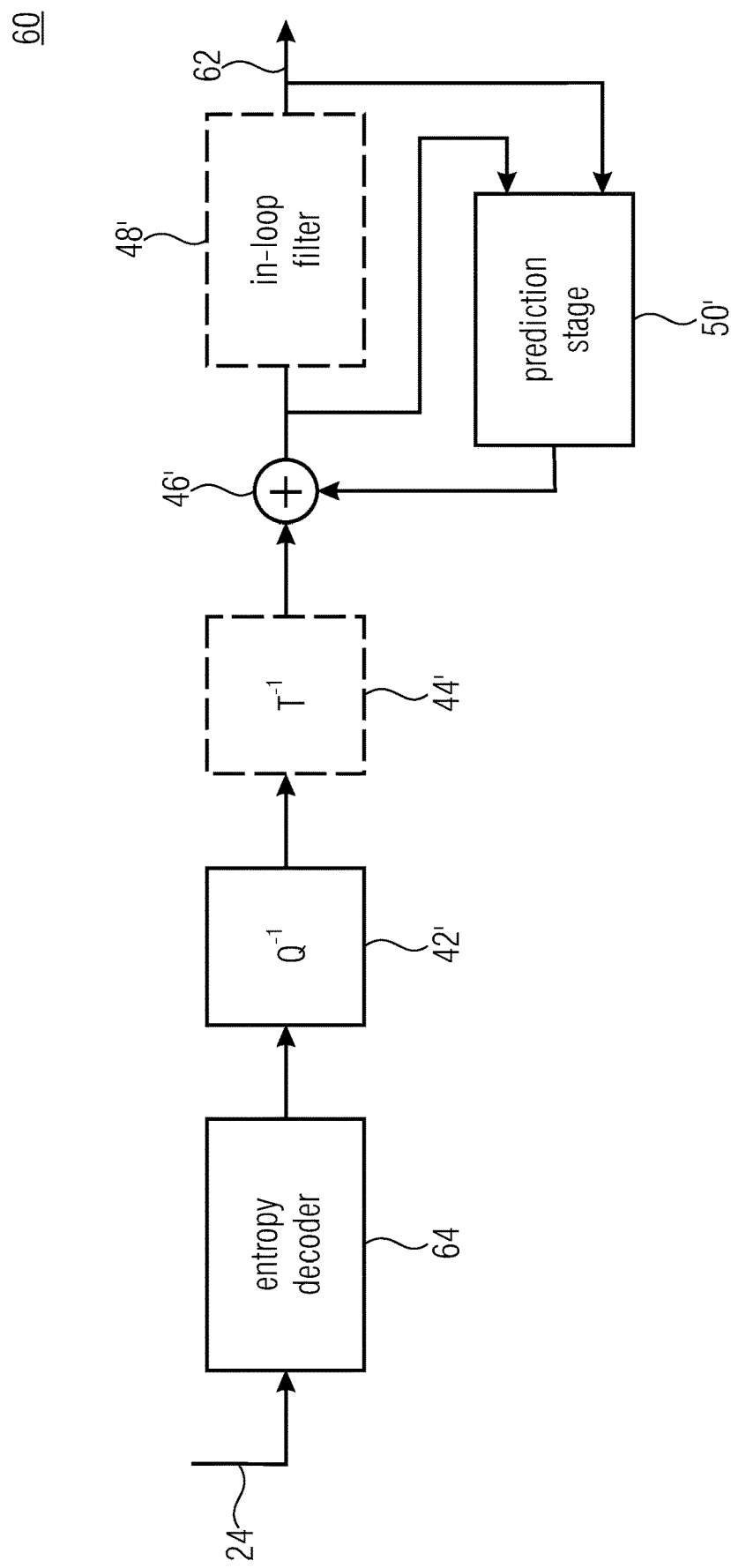
FIG. 3 shows a block diagram of a possible decoder able to decode a data stream output by the encoder shown in FIG. 1, the internal structure shown in FIG. 3 also serving as an implementation example for decoding stages occurring in other figures.

For sake of completeness, FIG. 3 shows a possible decoder 60 configured to decode from data stream 24, a reconstructed version 62 of video 28 and/or picture 12. Internally, this decoder comprises an entropy decoder 64 at the input of which the data stream 24 enters, followed by modules shown, and interconnected to each other in a manner shown, with respect to FIG. 2 so that the same reference signs have been used in FIG. 3 again, with an apostrophe, however, in order to indicate their presence in decoder 60 instead of encoder stage 22. That is, at the output of adder 46' or, optionally, the output of in-loop filter 48' the reconstructed signal 62 was obtained. Generally speaking, a difference between modules of encoding stage 22 of FIG. 2 and decoder 60 of FIG. 3 relies on the fact the encoding stage 22 determines or sets in accordance with some optimization scheme using, for instance, a Lagrangian cost function, depending on rate and distortion, the prediction parameters, prediction modes, the switching between residual transform of remaining and spatial domain for residual coding and so forth. Via data stream 24, the quantizer 42' obtains the quantization parameter variation/adaptation favorably chosen by apparatus 10. It uses the quantization parameter in the non-logarithmic domain as a factor in order to scale the quantized signal, namely the quantized residual signal obtained by entropy decoder 64 from data stream 24. The just-mentioned Lagrangian cost function may involve a Lagrangian rate/distortion parameter which is a factor applied to the coding rate with the corresponding product being added to the distortion to result into the Lagrangian cost function. This Lagrangian rate/distortion parameter may be adapted by the encoding stage 22 depending on the coding quantization parameter as described above with respect to equation 7.

In the following, a further embodiment of the present application is presented, called implicit visual QP adaptation (IV-QPA). Again, this embodiment is presented as a possible modification of HEVC with specific details presented. Thereinafter, broadening embodiments are described.

Figure 4:
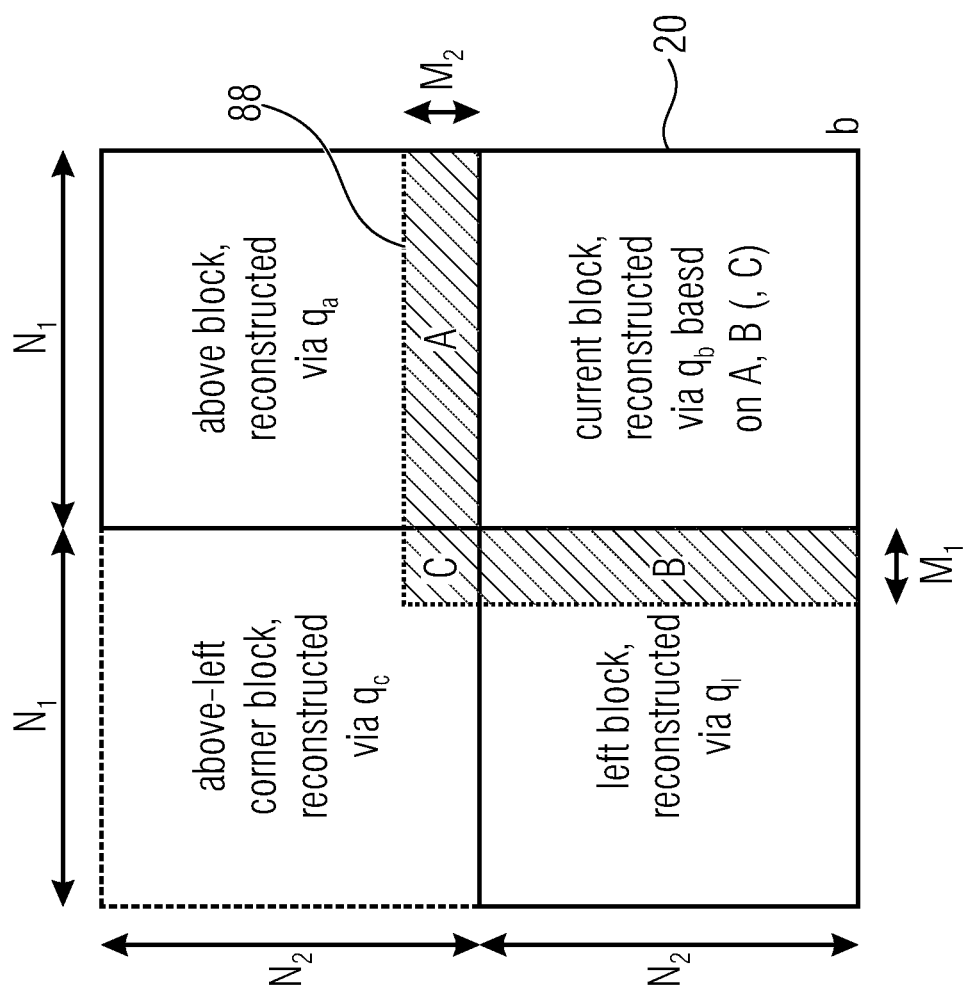
FIG. 4 shows a schematic diagram illustrating a current or predetermined block and spatially neighboring blocks in order to illustrate an implicit visual adaptation of a $QP_q$ for the current picture block b.

In case of block-wise QP adaptation according to, e. g., the previously described embodiment, the adjusted QP indices are coded differentially, usually with subsequent entropy coding (e.g., binary arithmetic coding), and multiplexed into the coded image or video bit-stream. An alternative to this explicitly signaled, visually motivated QP adaptation is an implicit visual QP adaptation (IV-QPA) approach in which the adapted QP index $q_b$ for each block b is not transmitted as part of the bit-stream but synchronously determined and applied at both the encoder and decoder side from existing bit-stream data. More specifically, each $q_b$ (current QP index) may be derived from the previously decoded and reconstructed image or video picture in the spatially adjacent left, above, and (optionally) above-left neighboring areas, as illustrated in FIG. 4. Notice that said neighboring blocks have been reconstructed using associated QP indices $q_a$ (above) and $q_l$ (left) which, in turn, may have been derived from respective neighboring reconstructed picture data.

The motivation behind the IV-QPA approach is the observation that, at all but very low image/video coding bit-rates, the decoded and reconstructed picture content closely approximates the initial input content and, as such, is equally well suited for visually motivated local QP adaptation (assuming the N×N block size associated with each QP is not too small). It can, therefore, be concluded that the additional codec bit-rate typically involved for conveying explicitly signaled block-wise adapted QP indices (which reaches up to roughly 0.5% of the total bit-rate at typical operating points) can be saved. In fact, informal experiments revealed that IV-QPA can, in terms of perceptual performance (i. e., visual quality gain), match existing explicit QP adaptation according to, e. g., the previously described embodiment. However, for correct operation and minimal algorithmic complexity overhead at the decoder side (the IV-QPA method has to, as noted, be carried out in both the encoder and decoder), two slight modifications to the algorithm calculating the $o_b$ offset for each block are needed, as described hereafter. As earlier, the inventive method is, advantageously, integrated into a block-based image or video transform coding design such as HEVC [8].

Given the spatial QP resolution as an aforementioned block size N×N, identically predefined in both the encoder and decoder, the IV-QPA method is controlled by an existing picture-wise (or, in a HEVC based codec, a slice-wise) "global" QP index q as mentioned above. To obtain the "local" QP offset $o_b$ for each block b, corresponding offsets $o_a$ and of are determined for the above and left neighboring blocks of b, respectively, if applicable. Specifically, if a decoded, reconstructed instance of the luma picture component, with pixels p, is available for the left neighbor (i. e., block b is not located at a left picture/slice boundary), ṕ(x,y) are computed via (2) for all x, y belonging to said left neighboring block. These high-pass filtered values are then used to obtain $\acute{P}_{1 \, or \, 2}$ (abbreviated as $\acute{P}_l$) according to (4) and, subsequently, its logarithmic representation $L(\acute{P}_l)$ using (5). If, analogously, a decoded, reconstructed instance of the luma picture is available for the above neighboring block (i. e., b is not located at a top picture/slice boundary), ṕ(x,y) are obtained for all x, y belonging to said above block. These values are used to derive $\acute{P}_a$ via (2) and $L(\acute{P}_a)$ via (5). Note that the same procedure can be employed to compute the low-pass counterparts $L(\grave{P}_l)$ and $L(\grave{P}_a)$ as in the previous description, but to minimize the computational workload especially at the decoder side, this is omitted in the present embodiment.

Having determined $L(\acute{P}_l)$ and $L(\acute{P}_a)$, but not $L(\dot{P}_l)$ and $L(\dot{P}_a)$, the "local" QP offset $o_b$ for the current block b can then be derived as follows. If neither $L(\acute{P}_l)$ nor $L(\acute{P}_a)$ are available, then $o_b$=0, i. e., $q_b$=q. If only $L(\acute{P}_l)$ is available, then $o_b$=d+$L(\acute{P}_l)$, where d is a constant which depends on the picture dimensions or the "global" q (for example, d=(($2^{19}$+ PictureWidth·PictureHeight)>>23)+(q>>3)−12, with ">>" denoting an integer right-shift). Likewise, if only $L(\acute{P}_a)$ is available, then $o_b$=d+$L(\acute{P}_a)$, using the same d. If, however, both the left and above neighboring values are available, then $o_b$=d+($L(\acute{P}_l)$+$L(\acute{P}_a)$)/2, and $q_b$=q+$o_b$. As described above, the reconstructed QP' for each block b is obtained using (1), and used in both the encoder (for normalization) and decoder (for scaling).

Figure 5:
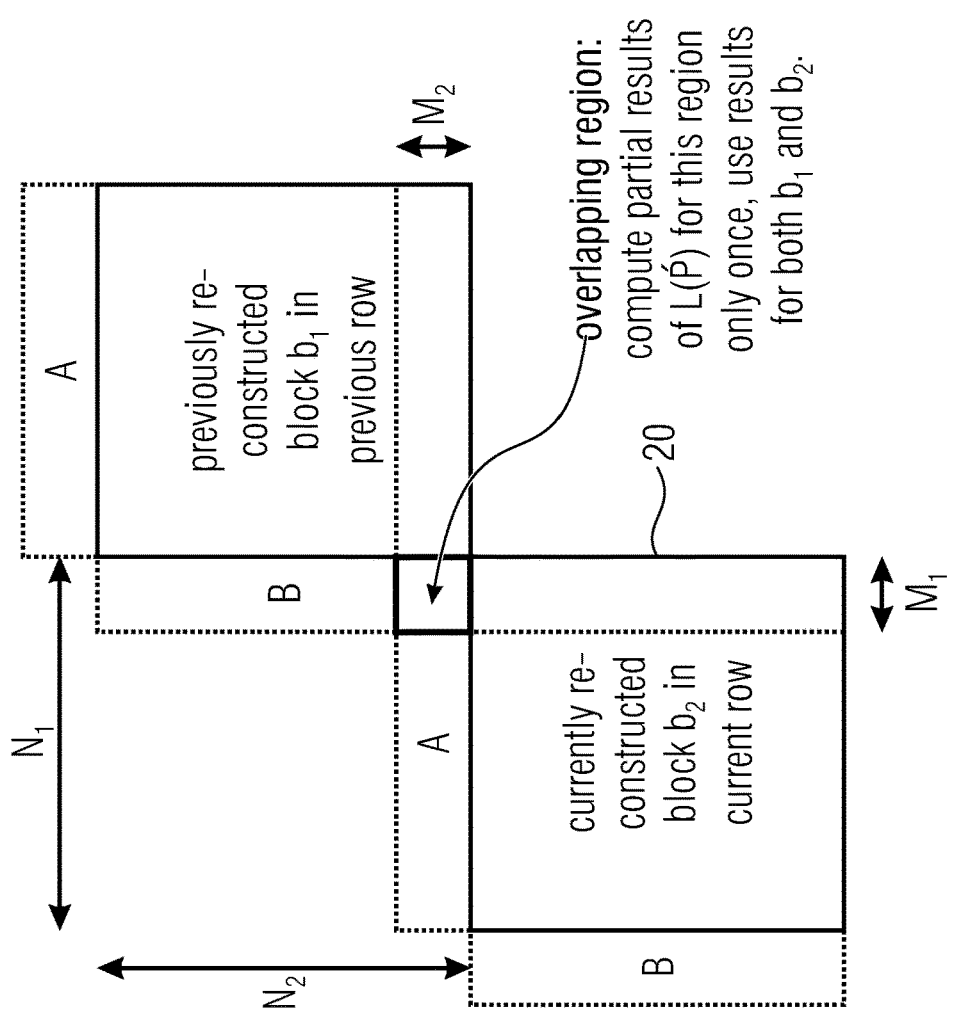
FIG. 5 shows a schematic diagram in order to illustrate with respect to the portion of a picture depicted in FIG. 4, an efficient minimum-complexity implementation of the implicit visual QP adaptation set forth in FIG. 4.
Figure 6:
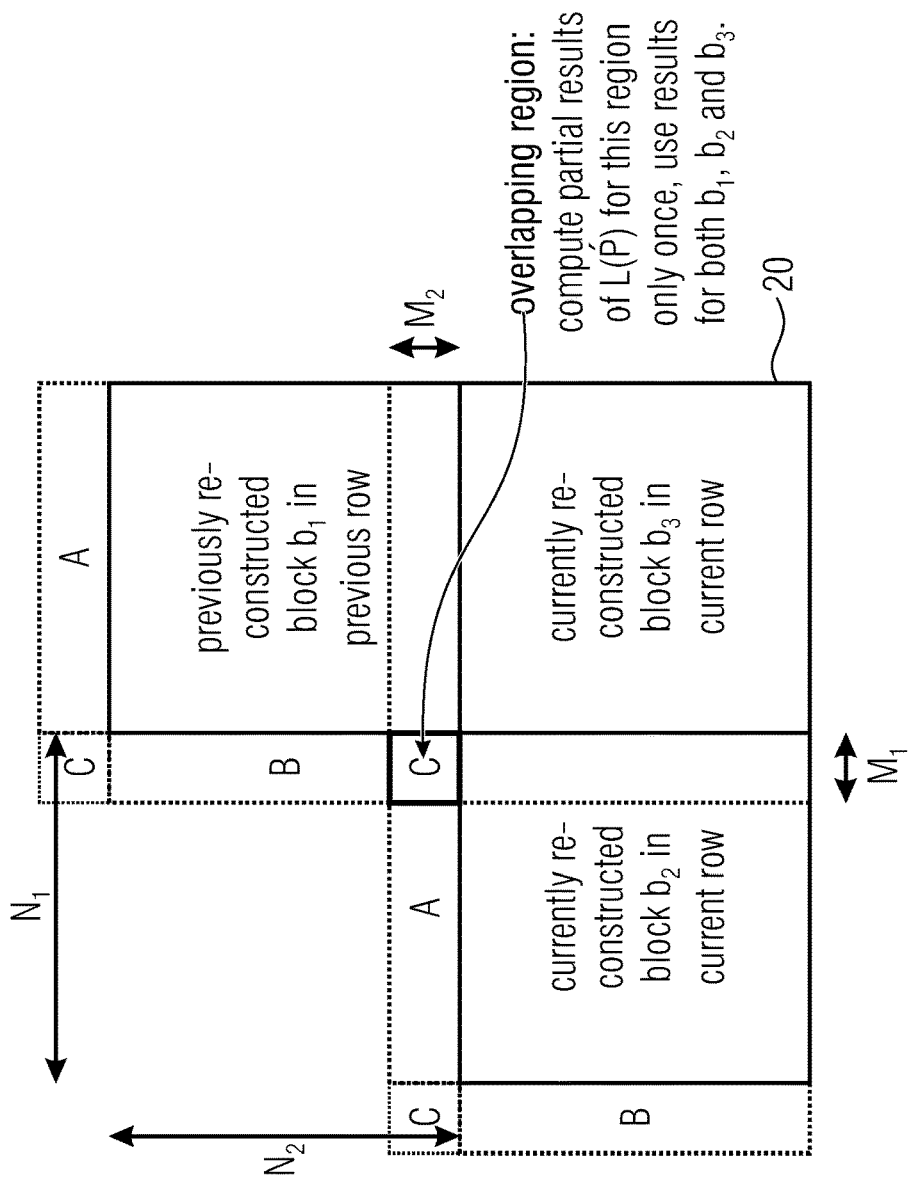
FIG. 6 shows a schematic diagram illustrating the situation in performing the implicit visual quantization parameter adaptation of FIG. 4 at that portion just as in FIG. 5, with, however, using the optional above-left neighboring area C.

Algorithmically, (2) is the most complex part of IV-QPA. However, it is worth noting that $L(\acute{P}_l)$ of a certain block $b_1$ in the previous picture row and $L(\acute{P}_a)$ of some block $b_2$ in the current picture row are computed on partially overlapping picture data. Hence, by saving the partial result of said $L(\acute{P}_l)$ operation for $b_1$ for the overlapping picture region and subsequently reusing said partial result during the computation of $L(\acute{P}_a)$ for $b_2$ in said current picture row, as depicted in FIG. 5, an overall reduction in the computational complexity of the present IV-QPA embodiment can be achieved. Note that, when the optional above-left neighboring $M_1 \times N_2$-sized region C of FIG. 4 is employed in the IV-QPA process, the shared partial result of the $L(\acute{P} \ldots)$ calculations for blocks $b_1$ and $b_2$ equals the result of the $L(\acute{P} \ldots)$ calculation for the above-left area C for the right-hand neighbor of block $b_2$, herein called $b_3$, processed after $b_2$. Thus, as shown in FIG. 6, the $L(\acute{P} \ldots)$ result for region C does not need to be computed for block $b_3$ as it is already available.

Revisiting FIG. 4, three further specifics shall be discussed. First, like the explicit QPA embodiment described previously, the IV-QPA scheme is generalized to allow for unequal horizontal and vertical block or CTU dimensions. This is illustrated by the separate definitions for the block/CTU width $N_1$ and height $N_2$ as a straightforward generalization of the N×N block/CTU size, which should be apparent to those skilled in the art. Second, FIG. 4 visualizes that the neighboring above, left, and above-left picture areas (A, B, and C, respectively) adjacent to the current picture block b may be, but do not necessarily need to be, of the same size as b. In other words, area A shall be of size $N_1 \times M_2$, wherein $M_2$ may or may not differ from $N_2$, B shall be of size $M_1 \times N_2$, wherein $M_1$ may or may not differ from $N_1$, and C shall be of size $M_1 \times M_2$, which may or may not differ from the block/CTU size $N_1 \times N_2$. Third, it is often desirable to, in an actual implementation, vary either $N_1$ and $N_2$ or $M_1$ and $M_2$, or both of the sets at the same time. In fact, the advantageous parameterization for the abovementioned IV-QPA embodiment uses fixed values $M_1$=$M_2$=32 in units of luma-channel pixels, irrespective of $N_1$ or $N_2$ which, advantageously, are varied input-adaptively by the image or video picture codec in dependence on said picture itself. For example, it is often beneficial to, in the encoder, use relatively large $N_1$ or $N_2$ for large input pictures (UHD or 4K or bigger, e. g., $N_1$=$N_2$=128), and smaller values (e. g., $N_1$=$N_2$=64) otherwise.

Figure 7:
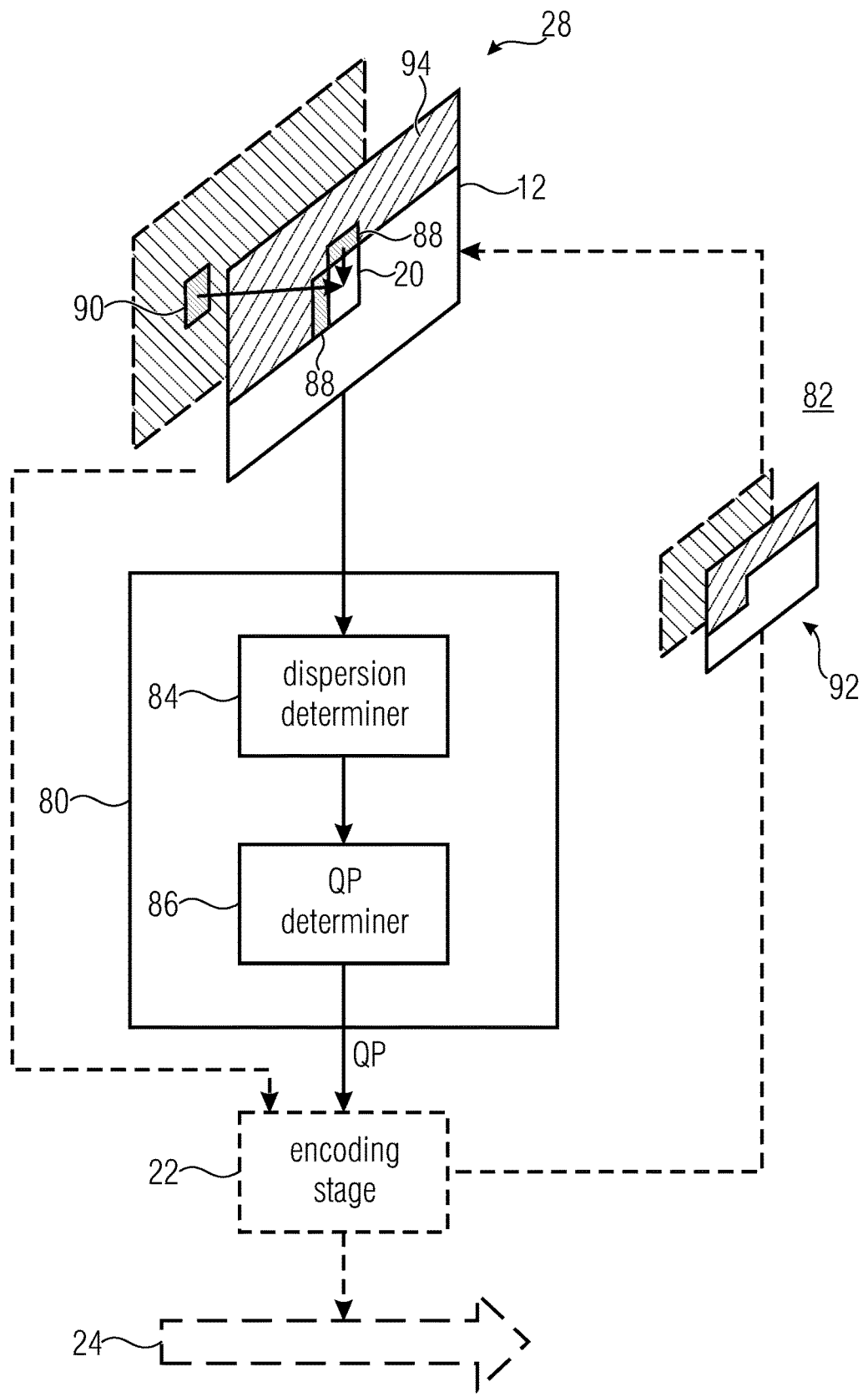
FIG. 7 shows a schematic block diagram illustrating an apparatus for varying/adapting a coding quantization parameter across a picture and its possible combination with an encoding stage to yield a corresponding encoder with the apparatus performing the quantization parameter variation/adaptation in a manner allowing synchronous performance of the same quantization parameter variation/adaptation at the decoder side, thereby avoiding spending any signaling overhead for explicitly signaling the quantization parameter variation/adaptation.

FIG. 7 shows an apparatus 80 for varying or adapting a coding quantization parameter QP across a picture 12 in a style similar to FIG. 1, i.e., by illustrating using dashed lines as to how this apparatus may be combined with an encoding stage 22 so as to result into a suitable encoder 82. The apparatus 80 uses a predicted dispersion to determine the coding quantization parameter for a predetermined block as outlined above. The internal structure of apparatus 80 includes a dispersion determiner 84 followed by a QP determiner 86. This time, however, the dispersion determiner 84 computes or determines a predicted dispersion. That is, dispersion determiner 84 determines a dispersion of a statistical sample value distribution of a predetermined block 20 or picture 12, or a filtered version of this block 20, but dispersion determiner 84 does not really exactly compute this dispersion but spatially or temporally predicts this dispersion from a spatial neighborhood or spatial temporal neighborhood of block 20. To be even more precise, and as explained above, dispersion determiner 84 shifts a dispersion calculation actually performed from block 20 to a neighborhood of this block so as to obtain one or more actually computed dispersion values and a predicted quantization parameter for block 20 is determined based on this substitute which, in so far, represents a predictor of the block's 20 dispersion. For instance, dispersion determiner 84 actually performs dispersion computation for one or more spatially neighboring blocks 88, spatially neighboring current block 2,0 of picture 12 and/or for one or more co-located blocks 90 of another picture. In FIGS. 4-6, for instance, a portion 88 of L-shape neighboring current block 20 has been used for the dispersion computation. It should be noted, however, that according to the embodiment of FIG. 7, the dispersion computation not necessarily adheres to the examples set out with respect to FIGS. 1-3, i.e., the dispersion computation does not necessarily take place in the high-pass filtered domain.

The QP determiner 86 receives from dispersion determiner 84 the predicted dispersion and determines, based thereon, the quantization parameter for block 20. Mainly details described above with respect to FIG. 1 and preceding embodiment may be used as applicable details for the embodiment of FIG. 7 individually or together. For instance, the dispersion determination performed by dispersion determiner 84 within portion 88 or 90 may use a $L_p$ norm with p≥1 to measure the dispersion, the dispersion measurement may be performed onto the high-pass filtered version of the respective portion or both, a high-pass filtered version and a low-pass filtered version thereof. As to high-pass filter and low-pass filter, the possibilities discussed above may apply. The same applies to possible variations as far as the measure of the dispersion is concerned. In this manner, apparatus 80 and determiners 84 and 86, respectively act on a plurality of blocks picture 12 is composed of, thereby varying/adapting a quantization parameter across picture 12.

When combined with encoding stage 22, however, apparatus 80 may be connected into a prediction loop of encoding stage 22 or another interface of encoding stage 22 where a signal is available which corresponds to reconstructable version 92 of picture 12, or video 28, as available encoding order up to block 20. Depending on the coding order underlying the encoding stage 22, the reconstructable version 92 covers, for instance, a portion 94 of picture 12 substantially above and to the left of block 20. Portion(s) 88 would lie within this portion. The reconstructable version 92 would also include, for instance, other pictures of video 28, including block 90. Thus, apparatus 80 would be combined with encoding stage 22 in a manner so that the dispersion determiner 84 would perform the predictive dispersion determination on the basis of the reconstructable version 92. For instance, apparatus 80 would receive the information available for prediction stage 50, i.e., at its input, as a reconstructable version 92 with the output of apparatus 80 at which the varied or adapted quantization parameter is output, being connected to the quantization parameter input of quantizer 36. Naturally, the encoding stage 22 would still receive the original version of the signal to be coded, namely the video and/or picture 12 so as to encode same into the corresponding data stream 24. In encoding, encoding stage 22 would use the quantization parameter as output for apparatus 80.

Differing from FIG. 1, however, no side information regarding the quantization parameter needs to be encoded into data stream 24. As the predictive dispersion determiner 84 determines the predictive dispersion based on the reconstructable version 92, the same quantization parameter, the same quantization parameter variation/adaptation may synchronously be performed on the basis of data stream 24 at the decoder side. Thus, in other words, in FIG. 1 it has been explained that apparatus 10 might be interactively combined by encoding stage 22 by receiving from encoding stage 22 some base quantization parameter which is determined by encoding stage 22, for instance, according to some rate distortion optimization scheme is then varied/adapted by apparatus 10 in the manner described. In case of FIG. 7, encoding stage 22 may also determine such base quantization parameter for picture 12 either as a whole or in slices, for instance, in picture 12. This base quantization parameter may be encoded by encoding stage 22 into data stream 24. Apparatus 80 also receives this base quantization parameter and varies same for each block 20 accordingly in the manner described. Additionally, however, apparatus 80 is also connected into the prediction loop of encoding stage 22 or, at least, receives from encoding stage 22 the reconstructable portion 94 of the reconstructable version 92 of picture 12 and based on the latter portion, namely within portion 88 and/or 90, dispersion determiner 84 determines the dispersion for a current block 20, i.e., by actually performing the dispersion determination spatially and/or temporally offset or shifted relative to current block 20 while then estimating or predicting the dispersion for block 20 based thereon.

With respect to remaining details, reference is made to the corresponding elements of FIGS. 1 and 2, respectively. That is, the encoding stage 22 may operate as described above with respect to FIGS. 1 and 2. Like in FIG. 1, the encoding stage 22 may, however, also be of another coding concept type. As described above, the predictive dispersion determiner 84 may operate on a high-pass filtered version of block(s) 88 and/or 90 only, or on both high-filtered version and low-pass filtered versions thereof, or on an un-filtered version of the reconstructable version 92 within this block or these blocks. Further, different possibilities exist with respect to the number of actually determined dispersions for a current block 20. For instance, as described with respect to FIGS. 4-6 more than one such dispersion may be computer by dispersion determiner 84 such as, for instance, one per block of blocks 88/90, within determining the coding quantization parameter QP for current block 20 based thereon. This may, as discussed with respect to FIGS. 4-6, enable a reduction of computation overhead by re-using some computed dispersion values for neighboring blocks for which the quantization parameter needs to be varied/adapted subsequently.

Figure 8:
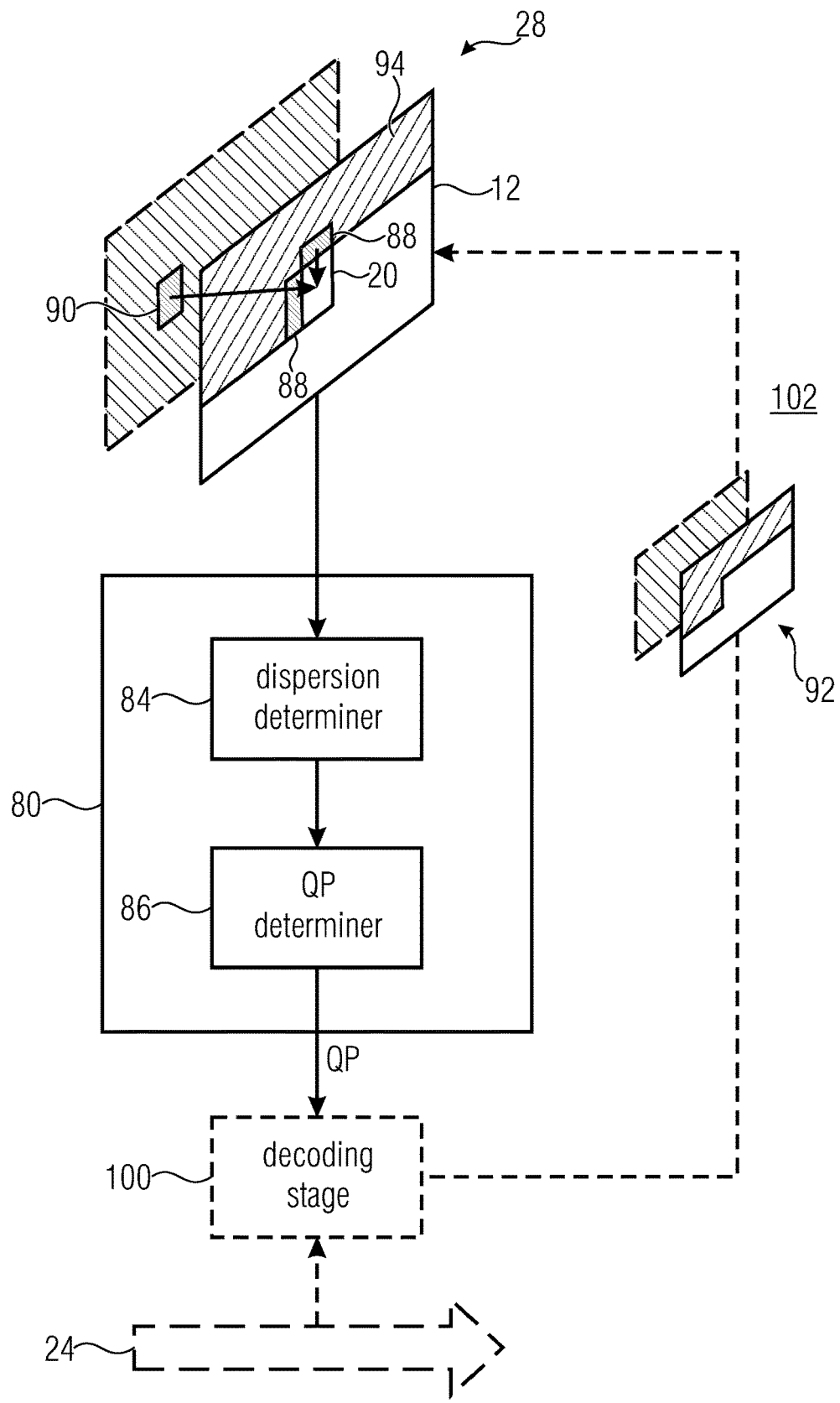
FIG. 8 shows a schematic diagram showing the apparatus of FIG. 7 and its combination with a decoding stage in order to yield a decoder fitting to the encoder of FIG. 7, i.e., being able to decode the data stream generated by an encoder of FIG. 7, with the apparatus varying the quantization parameter across the picture synchronously with FIG. 7.

FIG. 8 shows, for sake of completeness, the apparatus 80 of FIG. 7 combined with a decoding stage 100 so as to result into a decoder 102 fitting to the encoder end of 82 in the sense that decoder 102 is able to decode from data stream 24 as generated by the encoder 82 of FIG. 7, a reconstructed version of video 28 and/or picture 12. The decoding stage 100 may, for instance, be construed as explained above with respect to FIG. 3. Then, the QP output by apparatus 80 is received by the dequantizer 42' with the apparatus 80 being fed with the signals input into prediction stage 50'. As explained, data stream 24 does not need to carry any details or any side information concerning the quantization parameter variation/adaptation. Rather, apparatus 80 has access to the same information as on the side of the encoder 82 and accordingly, emulates the same operation and outputs, in a manner synchronous to FIG. 7, a varied/adapted quantization parameter. Thus, again, and in order to be clear, differing from the previous description of FIG. 3 where the dequantizer 42' of decoder 60 received the quantization parameter by explicit signaling in the data stream 24, when the decoder 60 is used as a decoding stage 100, then the dequantizer 42' receives the quantization parameter by apparatus 80.

Next, a possible extension of the above-described QP variation/adaptation concepts is described. Again, the description starts with a more concrete embodiment followed by a description of a broader embodiment with respect to FIG. 9 and afterwards, it is illustrated that this aspect may also be used irrespective of the other details set forth with respect to FIGS. 1-8.

Even with the QP adaptation described above, some image block b may be quantized too coarsely, preserving only the low-frequency average brightness (luma) and color (chroma) of b. To reduce this effect, a high-frequency SNR greater than zero dB can be enforced as follows. First, QP' is derived from the adapted $q_b$ via (1). Then, the mean value (DC offset) of all input luma pixels $p \in b$ is calculated and subtracted from said p. The magnitudes of the resulting zero-mean luma pixels are averaged across b, yielding avg. Then, if avg<$\beta \cdot$QP' (where empirical constant $\beta$ depends on the luma image/video bit-depth), $q_b$ is reduced by a logarithmic difference:

$$q'_b = \max(q_{min}, q_b + L(\text{avg}) - L(\beta \cdot QP')), g_{min} \text{ usually } 0 \text{ or } 1, \quad (8)$$

with $L(\cdot)$ as given by (5). Using $q'_b$, a modified QP' is derived via (1) and used for the actual coding. Note that, in practice, a small value of, e. g., one is added to avg to prevent occurrences of L(0).

Also, an update of the rate-distortion parameter $\lambda'_b$ can be carried out similarly to (7), with $o_b$ therein now representing the logarithmic difference $L(\text{avg}) - L(\beta \cdot QP')$. The block-wise non-zero high-frequency SNR enforcement described in this concluding section proved beneficial on some sports photography and video content, preserving a bit more of the images' fine-structure and texture on flat surfaces such as lawn (football), court (tennis), or race track (athletics).

Figure 9:
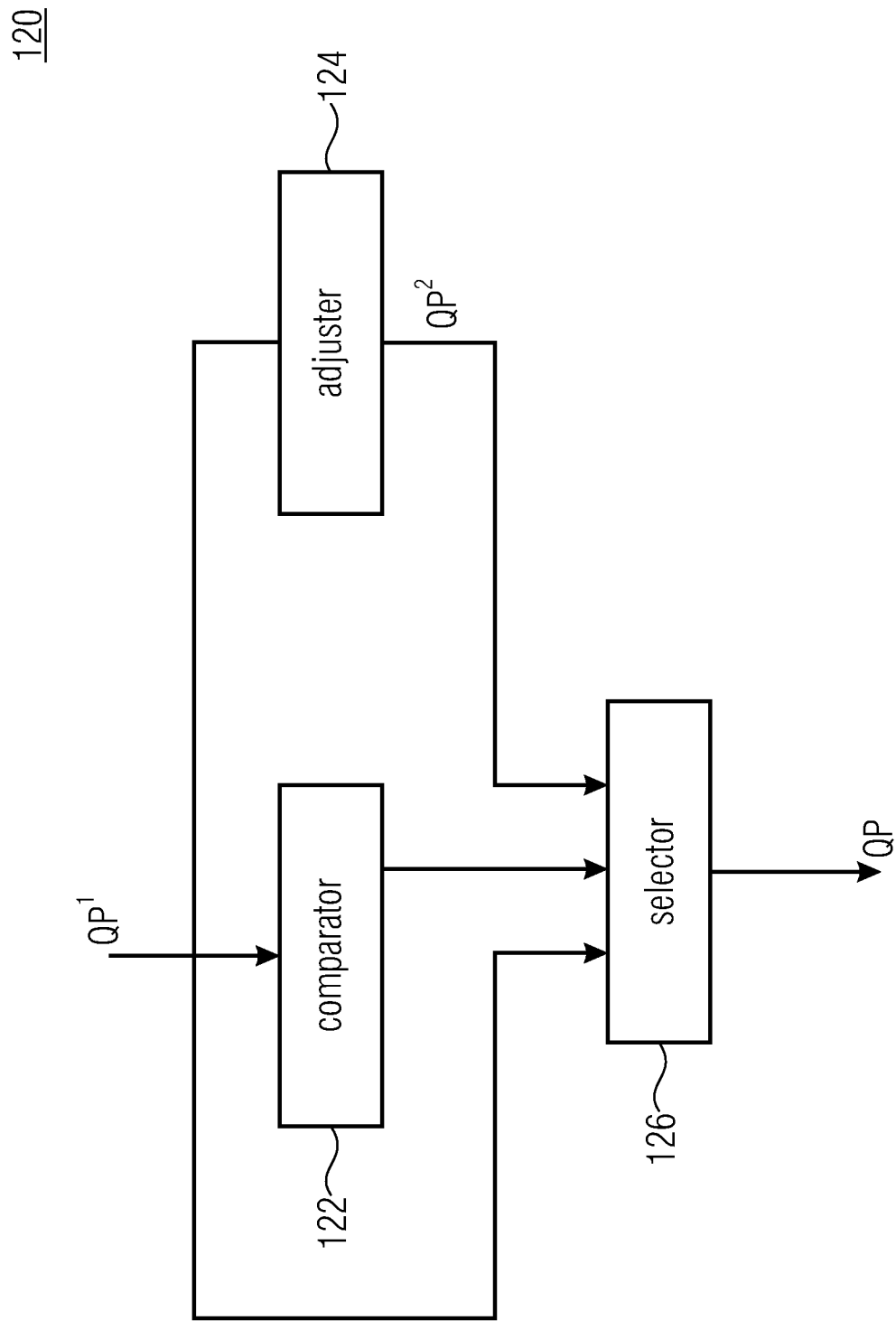
FIG. 9 shows a block diagram of a possible quantization parameter final check stage which could be built into the examples shown in the previous figures in order to perform quantization parameter adjustments on the varied/adapted quantization parameter in case of the quantization parameter getting too coarse.

FIG. 9 illustrates the just-outlined final check stage concept by illustrating an apparatus 120 for performing a final check onto a preliminarily determined final result for a quantization parameter for a certain block of a picture. In FIG. 9, this quantization parameter is exemplarily indicated as $QP^1$. At the output of apparatus 120, the final version of the quantization parameter QP is output. Apparatus 120 may, for instance, be attached downstream apparatus 10 or apparatus 80 so as perform the final check onto the respective quantization parameter output by this apparatus 10 or 80, but apparatus 120 may also be used irrespective of the aforementioned described figures and their embodiments as described later with respect to FIG. 10.

The apparatus 120 comprises a comparator 122 and an adjuster 124. The comparator 122 performs a comparison between the coding quantization parameter $QP^1$ assigned to a predetermined block of the picture and certain threshold, namely a threshold which depends on a mean difference of sample values of this predetermined block to the sample values' mean value. To this end, comparator 122 has, for instance, access to the original or un-quantized version of the predetermined block. In the above example, this threshold was AVG/β. In particular, the comparator 122 checks whether the coding quantization parameter $QP^1$ is greater or lower than the threshold and outputs the result to selector 126 of apparatus 120. Selector 126 has two inputs, namely one receiving $QP^1$, and another receiving $QP^2$ as output by adjustor 124. The adjustor 124 receives $QP^1$ and adjusts same to result into $QP^2$ with $QP^2$ corresponding to a finer quantization than $QP^1$. If the first coding parameter deviates from the threshold towards a direction of coarser quantization, i.e., is greater than avg in the example set out above, selector 126 selects the input at which $QP^2$ is applied by adjuster 124 and outputs this quantization parameter $QP^2$ at its output as the quantization parameter QP to be finally used. Otherwise, selector 126 outputs $QP^1$ as QP. The adjustment by adjustor 124 may be performed as described above in equation 8.

Figure 10:
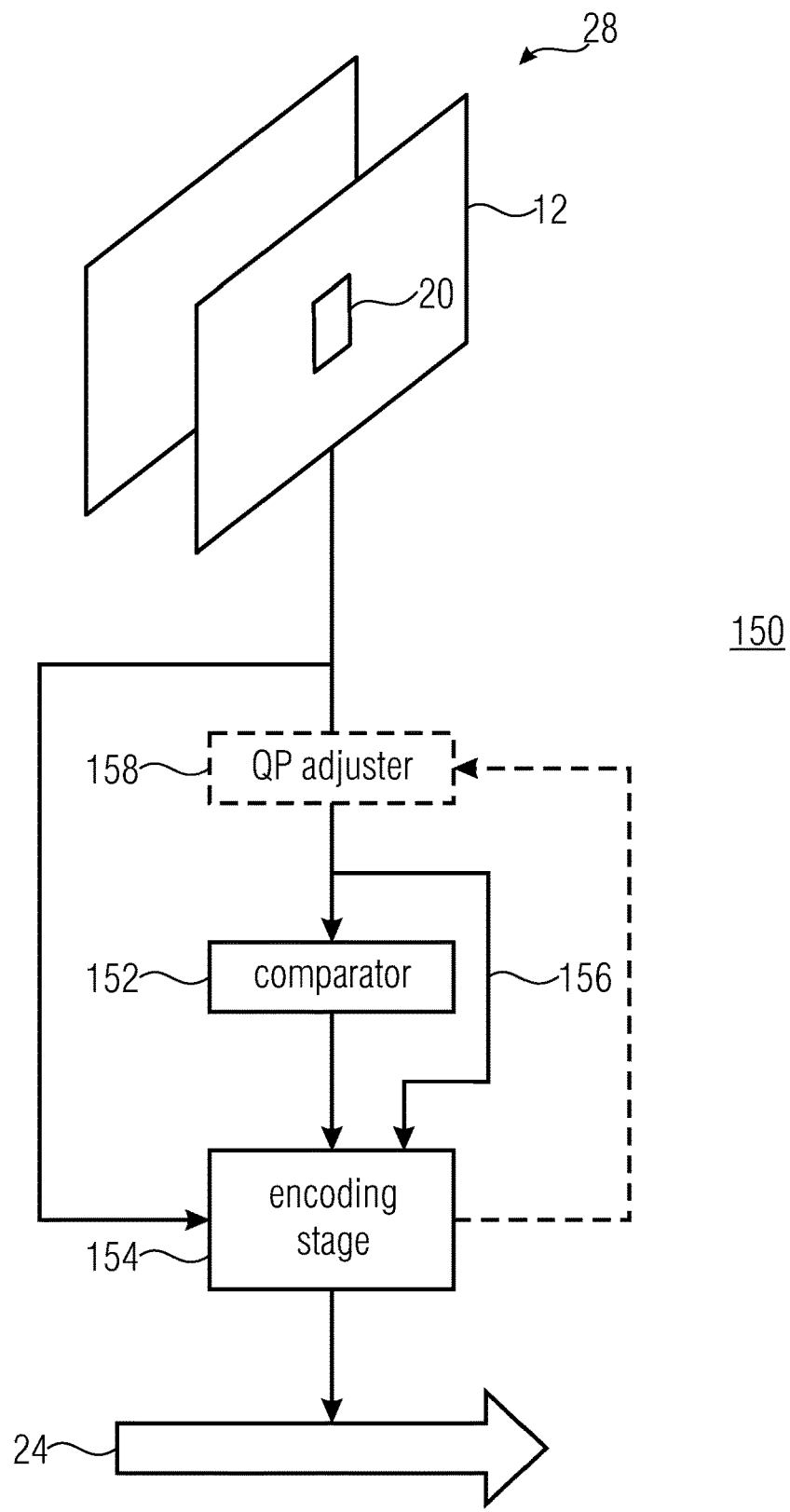
FIG. 10 shows an example for an encoder using the final check functionality of FIG. 9 in connection with any type of quantization parameter assignment.

As already stated above at the beginning of the description of FIG. 9 and its corresponding concrete example, the comparison performed by comparator 122 may also advantageously be used if not using the quantization parameter variation/adaptation according to any of FIG. 1 or FIG. 7. To illustrate this, see FIG. 10 which shows an encoder 150 configured to encode picture 12 into data stream 24. Encoder 150 is shown to comprise a comparator 152 which substantially corresponds to comparator 122 of FIG. 9, and an encoding stage 154 which could be implemented in the manner described above with respect to encoding stages 22. That is, the encoding stage 154 receives the signal to be coded, mainly picture 12 which, in turn, could be part of a video 28 with encoder 150 being a video encoder. Further, encoding stage 154 is of the lossy encoding type just as encoding stage 22 presented above was and for each of a plurality of blocks pictures 12 is composed of such as block 20, the encoding stage 154 using a corresponding quantization parameter received by encoding stage 154 via a quantization parameter control input 156. Additionally, encoding stage 154 is responsive to a comparison result forwarded by comparator 152. In particular, comparator 152 receives the quantization parameter applied to encoding stage 154, too and compares same with a threshold as described with respect to FIG. 9 with respect to comparator 122. Many possibilities exist as to how the quantization parameter is applied via input 156 to encoding stage 154. For example, the quantization parameter could be applied to encoding stage 154 at global scope, i.e., so that quantization parameter is constant across picture 12. The quantization parameter applied at input 156, and concurrently to comparator 152, could alternatively vary across picture in slices for instance. Whatever scope, the quantization parameters applied to comparator 152 and encoding stage 154 could be set by default, or could be determined otherwise. FIG. 10, for instance, illustrates that the quantization parameter is at least partially also controlled via encoding stage 154 by way of, for instance, a rate control of encoding stage 154. Additionally, FIG. 10 illustrates the possibility that the encoder 150 comprises a QP adjuster 158 which adjusts or varies the quantization parameter across picture 12. QP adjuster 158 could, for instance, be implemented in a manner coinciding with the description of apparatus 10 of FIG. 1. That is, QP adjuster 158 may receive a base quantization parameter from encoding stage 154 at a scope of the overall picture 12 or slices thereof, and block-wise adjust the quantization parameter.

The block partitionings mentioned so far may be different. For instance, the quantization parameter entering comparator 152 and encoding stage 154, for instance, may vary at a certain block partitioning or block granularity as just-described. That is, this QP may be defined globally for picture 12, may vary in slices or may vary in predetermined blocks forming a partitioning of picture 12. Comparator 152 also operates block-wise, but the blocks at which comparator 152 operates, may differ from the block partitioning underlying the definition of the quantization parameter entering comparator 152 and encoding stage 150, respectively. As an example, the block partitioning may coincide. That is, the quantization parameter entering comparator 152 and encoding stage 154 may be defined at a block granularity coinciding with a block granularity at which comparator 152 performs the comparison.

Comparator 152, then, compares for a certain block such as block 20 in FIG. 10, the entering coding quantization parameter for this block 20 with a threshold which depends on a mean difference to sample average of this block 20. This mean difference has been denoted as avg in the above description with a threshold being avg/β, but other examples may also hold true. Moreover, it should be noted the comparison not necessarily has to be performed in the non-logarithmic domain or, in other words, the coding quantization parameter may have another relationship the actual quantization step size or the quantization accuracy than the linear one with positive dependency as it has been true with QP denoted above. Frankly speaking, comparator 152 checks on the basis of the mean difference avg whether the quantization defined by the inbound coding quantization parameter for block 20 is fine enough or, in other words, whether the quantization step size defined by the inbound quantization parameter is below a predetermined factor times the mean difference where β is, for instance, smaller than 1. The comparator forwards the comparison result to encoding stage 154 and the encoding stage 154 may, in addition to the functionalities associated with an encoding stage such as those discussed above with respect to encoding stage 22, comprise the functionalities described in FIG. 9 with respect to blocks 124 and 126. That is, encoding stage 154 may, depending on the comparison result, adjust for a corresponding block 20 the inbound quantization parameter so as to correspond to a finer quantization and use the thus adjusted coding quantization parameter within the respective block 20 for encoding instead of the originally inbound one, or may leave the inbound quantization parameter within the respective block as it is and use same for encoding within the respective block. As discussed above, the adjustment of the quantization parameter may, for instance, be made in such a manner that the adjusted quantization parameter is held to a value corresponding to the broadest quantization still complying with the mean difference. For instance, in adjusting the quantization parameter such as in block 124 or within encoding stage 154 the difference between the preliminary quantization parameter and the threshold is measured in logarithmic domain yielding the difference between the two L terms in equation 8. This logarithmic measure for the difference is then applied to the preliminary quantization parameter in logarithmic domain, namely $q_b$ in case of equation 8, in order to improve the quantization or get it finer which corresponds to a subtraction in case of FIG. 8, i.e., $q_b$ is made smaller.

Naturally, the adjustment or reduction may also be performed differently such as by applying a certain factor or determine the amount of reduction by other means.

As already stated above, the encoding stage 22 then uses the adjusted quantization in case of adjustment, or the inbound quantization parameter in case of non-adjustment for encoding and with respect to details in this regard, reference is made to the discussion of previous FIGS. 1-9.

Turning to the third aspect of the present application, it should be noted that with respect to same FIG. 1 shows a schematic block diagram of an apparatus for varying a coding quantization parameter, firstly described in mono-channel sense and then serving as an example for a channel-specific QP adaptation apparatus, and a possible combination thereof with an encoding stage to yield an encoder, possibly a multi-channel encoder, the figure firstly ought to exemplify the possibility of using the dispersion of sample values of a high-pass filtered version of a current block so as to determine or adjust the quantization parameter, and then serving as an example for an QP adaptation apparatus for multi-channel coding. Fig. Likewise, FIG. 7 shows a schematic block diagram illustrating an apparatus for varying/adapting a coding quantization parameter across a picture, firstly described in mono-channel sense and then serving as an example for a channel-specific QP adaptation apparatus, and its possible combination with an encoding stage to yield a corresponding encoder, such as an multi-channel encoder, with the apparatus performing the quantization parameter variation/adaptation in a manner allowing synchronous performance of the same quantization parameter variation/adaptation at the decoder side, thereby avoiding spending any signaling overhead for explicitly signaling the quantization parameter variation/adaptation, and FIG. 8 shows a schematic diagram showing the apparatus of FIG. 7 and its combination with a decoding stage in order to yield a multi-channel decoder fitting to the encoder of FIG. 7, i.e., being able to decode the data stream generated by an encoder of FIG. 7, with the apparatus varying the quantization parameter across the picture synchronously with FIG. 7.

Embodiments relating to the third aspect of the present application are attained by extending the above description of apparatuses, encoders and decoders to the extent that the QP adaptation outlined with respect to each of these embodiments is performed for each channel of a multi-channel picture individually. A channel may relate to one of luma, chroma channel, a color channel and a depth map. Thus, all of the above embodiments may be used as a basis and form embodiments of the present application by performing the QP adaptation implemented therein and described above for each channel individually. Embodiments result where coding quantization parameter adaptation across a multi-channel picture 12 which samples picture content for each of a plurality of channels, is done by determining 86 a first-channel coding quantization parameter for a predetermined block on the basis of an evaluation 84 of first-channel samples such as using IV-QPA within the first channel, and determining 86 a second-channel coding quantization parameter for the predetermined block on the basis of an evaluation 84 of second-channel samples, also using IV-QPA, for instance, but within the second channel. Thus, in FIG. 7 and FIG. 8, for instance, both determiners would operate separately on, and for, each channel. The determining the first-channel coding quantization parameter for the predetermined block may be done by measuring 84 an activity of first-channel samples, and the determining the second-channel coding quantization parameter for the predetermined block by measuring 84 an activity of the second-channel samples. The activity of the first-channel samples and the measuring the activity of the second-channel samples within a neighborhood 88 of the predetermined block 20, i.e. on the basis of neighboring first-channel samples for the first-channel QP, and on the basis of neighboring second-channel samples for the second-channel QP. Thereby, a dispersion of a statistical sample value distribution of first-channel samples within a neighborhood 88 of the predetermined block 20 would be determined as a measure for the activity of the first-channel samples, and a dispersion of a statistical sample value distribution of second-channel samples within a neighborhood 88 of the predetermined block 20 of the multi-channel picture 12 would be determined as a measure for the activity of the second-channel samples. The determination of the dispersion of a statistical sample value distribution of first-channel samples and/or the determination of the dispersion of a statistical sample value distribution of second-channel samples one a filtered version of the neighborhood such as high-pass filtered version wherein the high-pass filter discussed previously would be separately applied to the first channel and second channel respectively. Accordingly, first-channel samples within one or more blocks in a neighborhood of the predetermined block 20 would be subject to the high-pass filtering to obtain high-pass filtered first-channel sample values of the one or more blocks and a dispersion of a statistical sample value distribution of high-pass filtered first-channel samples would be used as a measure for the activity of the first-channel samples, and/or the second-channel samples within one or more blocks in a neighborhood of the predetermined block 20 would be subject to high-pass filtering to obtain high-pass filtered second-channel sample values of the one or more blocks and a dispersion of a statistical sample value distribution of high-pass filtered second-channel samples would be used as a measure for the activity of the second-channel samples. The high-pas filter may assign to each first (second) channel sample position within the one or more blocks, a sum of a first (second) channel sample value of the respective sample position times a first weight, and first (second) channel sample values of sample positions spatially neighboring the respective sample position times second weights or a value depending on the sum, wherein the first weight on the one hand and the second weights on the other hand differ in sign. An $L_p$ norm with h p≥1 to could be used to measure the dispersion in each channel, with p possibly being different for the channels. The dispersion could be subject to logarithmization, again possibly in each channel. For each channel, the neighborhood used for activity measurement for deriving the QP for coding the block in terms of the respective channel may be a spatial neighborhood of the predetermined block, i.e. spatially neighboring samples for the same channel may be used, and/or a spatially corresponding portion of a different multi-channel picture, i.e. samples of the same channel in a spatially corresponding block of temporally different picture. The channel-individually determined coding quantization parameters for a predetermined block may be used directly, or they may form merely a predictor with a finally determined coding quantization parameter for each channel being determined from the predictor for this channel by selection out of a channel specific plurality of QP predictors, for instance, and signaling, for one channel or for each channel separately, the selected QP as side information in the data stream 24, or by signaling, for one channel or for each channel separately, in the data stream 24 a QP prediction residual which indicates the QP for the respective channel relative to the QP parameter which has been determined for the respective channel by analyzing the samples of that channel. Thus, the first-channel coding quantization parameter may be used as a predictor for a finally determined first-channel coding quantization parameter for the predetermined block, and/or second-channel coding quantization parameter as a predictor for a finally determined second-channel coding quantization parameter for the predetermined block. The first-channel samples may be luma samples and the second-channel samples chroma samples. An encoder 102 for encoding a multi-channel picture into a data stream may comprising such an apparatus 80 for performing coding quantization parameter adaptation across the multi-channel picture 12 to obtain a first-channel coding quantization parameter and a second-channel coding quantization parameter, and encode the multi-channel picture into the data stream 24 using the first-channel coding quantization parameter and the second-channel coding quantization parameter. The encoder may encode the multi-channel picture into the data stream using predictive coding to obtain a first-channel residual signal and a second-channel residual signal and encode into the data stream the first-channel residual signal using the first-channel coding quantization parameter and the second-channel residual signal using the second-channel coding quantization parameter. The encoder may obtain a first-channel residual signal and a second-channel residual signal using the picture and using predictive coding, quantize the first-channel residual signal using the first-channel coding quantization parameter and the second-channel residual signal using the second-channel coding quantization parameter, and encode the quantized first-channel residual signal and the quantized second-channel residual signal into the data stream. The coding quantization parameter adaptation may be performed based on a version of the multi-channel picture reconstructible from the data stream, e.g. on a version passing the decoded picture buffer, for instance, or a version also available for spatial prediction or intra-coded picture blocks, respectively. The first-channel coding quantization parameter and the second-channel coding quantization parameter may be determined depending on the predicted dispersion in logarithmic domain and the encoding engine may be configured to, in encoding the multi-channel picture using the first-channel coding quantization parameter and the second-channel coding quantization parameter, apply the first-channel coding quantization parameter and the second-channel coding quantization parameter in a manner where same act as a divisor for a signal to be quantized prior to quantization in non-logarithmic domain. A decoder 82 for decoding a multi-channel picture from a data stream, may comprise such an apparatus 80 for coding quantization parameter adaptation across the multi-channel picture 12 to obtain a first-channel coding quantization parameter and a second-channel coding quantization parameter, and decode the multi-channel picture from the data stream 24 using the first-channel coding quantization parameter and the second-channel coding quantization parameter. The decoding stage 100 is configured to decode from the data stream a first-channel residual signal and a second-channel residual signal, dequantize the first-channel residual signal using first-channel the coding quantization parameter and the second-channel residual signal using second-channel the coding quantization parameter and decode the multi-channel picture from the data stream using the first-channel residual signal and the second-channel residual signal and using predictive decoding. The coding quantization parameter adaptation may be performed based on a version of the multi-channel picture reconstructed from the data stream by the decoding stage. The decoder may determine the first-channel coding quantization parameter and the second-channel coding quantization parameter depending on the predicted dispersion in logarithmic domain and the decoding engine of the decoder may, in decoding the multi-channel picture, transfer the first-channel coding quantization parameter and the second-channel coding quantization parameter from the logarithmic domain to non-logarithmic domain by exponentiation and apply the first-channel coding quantization parameter and the second-channel coding quantization parameter in the non-logarithmic domain as a factor to scale a quantized signal transmitted by the data stream. Embodiments of the present application are also attainable by extending the above description of apparatuses, encoders and decoders of FIG. 1 to the extent that the QP adaptation outlined with respect to each of these embodiments is performed for each channel of a multi-channel picture individually. Thus, coding quantization parameter adaptation across a multi-channel picture 12 which samples picture content for each of a plurality of channels, may be done by determining 16 a first-channel coding quantization parameter for a predetermined block on the basis of an evaluation 14 of first-channel samples such as using explicit QPA within the first channel, and determining 16 a second-channel coding quantization parameter for the predetermined block on the basis of an evaluation 14 of second-channel samples, also using explicit QPA, for instance, but within the second channel. Other than described in FIG. 1, the evaluation done per channel, may be done with not using the high-pass filtered basis for dispersion determination in 14. The data stream 24 would carry, i.e. would be provided with, explicitly signalization for the thus channel individually determined QP per channel. The resulting encoder 26, which inherits apparatus 10, could, in encoding the multi-channel picture 12 into the data stream 24, adapt a Lagrangian rate-distortion parameter specifically for each channel, i.e. a first-channel Lagrangian rate-distortion parameter depending on the first-channel coding quantization parameter and a second-channel Lagrangian rate-distortion parameter depending on the second-channel coding quantization parameter. Here, in determining 16 the first-channel coding quantization parameter for the predetermined block 20 the first-channel samples in block 20 itself may be evaluated, and likewise, for determination of the second-channel coding quantization parameter for the predetermined block, the second-channel samples within this block 20 may be evaluated. Again, The evaluation may focus on the activity, measured, for instance, in form of a dispersion and, for instance, in high-pass filtered domain.

As to the channels, more than two channels may be treated separately for QP adaptation in the just-described manner, such as for luma and two chroma channels or even four different color channels of another color space, or even other channel combinations.

The above described embodiments represent a deviation from contemporary perceptual image and video coding specifications which allow for the quantization parameter (QP) to be adapted, applied, and conveyed to the decoder on a picture-by-picture or block-by-block basis, in order to enable subjective optimizations of the coding quality. With color images and videos, this so-called QP adaptation can be performed separately and independently for one component (e.g., the luma/Y component in the YCbCr format) and for the remaining component(s) (e.g., the chroma/CbCr component in the YCbCr format). The High Efficiency Video Coding (HEVC) standard is a prominent recent example of where such separated luma/chroma QP adaptation is possible. However, a separated luma/chroma QP adaptation scheme has not been presented so far. In particular, the block-wise adapted QP values are determined equally for both the luma and chroma component of the image/video. According to above embodiments, QP adaptation is separately and independently performed on, for example, luma and on the remaining component(s) when coding a multi-component image or video. Furthermore, QP adaptation may, separately and independently, be applied on each and every component of the multi-component image or video. Existing or currently developed image or video coding specifications such as HEVC or its successors may be extended, to allow adaptation, application, and signaling of QP data separately and independently for each and every component of a multi-component image or video, in order to allow to achieve maximum visual improvement of coding quality.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] W. Osberger, S. Hammond, and N. Bergmann, "An MPEG Encoder Incorporating Perceptually Based Quantisation," in *Proc. IEEE Annual Conf. Speech & Image Technologies for Comput. & Telecomm.*, Brisbane, vol. 2, pp. 731-734, 1997.

[2] T. Wiegand, H. Schwarz, A. Joch, F. Kossentini, and G. J. Sullivan, "Rate-Constrained Coder Control and Comparison of Video Coding Standards," *IEEE Trans. Circuits Systems for Video Technology*, vol. 13, no. 7, pp. 688-703, July 2003.

[3] V. V. Gohokar and V. N. Gohokar, "Optimum Bit Allocation Using Human Visual System for Video Compression," in *Proc. IEEE Int. Conf. Comput. Intelligence Multim. Applic.*, Sivakasi, pp. 84-88, December 2007.

[4] C. Yeo, H. L. Tan, and Y. H. Tan, "SSIM-Based Adaptive Quantization in HEVC," in *Proc. IEEE Int. Conf. Acoustics, Speech, Signal Process.*, Vancouver, pp. 1690-1694, 2013.

[5] W.-W. Chao, Y.-Y. Chen, and S.-Y. Chien, "Perceptual HEVC/H.265 System with Local Just-Noticeable Difference Model," in *Proc. IEEE Int. Symp. Circuits Systems (ISCAS)*, Montreal, pp. 2679-2682, May 2016.

[6] F. Zhang and D. R. Bull, "HEVC Enhancement using Content-Based Local QP Selection," in *Proc. IEEE Int. Conf. Image Process. (ICIP)*, Phoenix, pp. 4215-4219, September 2016.

[7] Z. Wei and K. N. Ngan, "Spatio-Temporal Just Noticeable Distortion Profile for Grey Scale Image/Video in DCT Domain," *IEEE Trans. Circuits Systems for Video Technology*, vol. 19, no. 3, pp. 337-346, March 2009.

[8] ITU-T, Recommendation H.265 and ISO/IEC, Int. Standard 23008-2, "High efficiency video coding," Geneva, Switzerland, January 2017, online: http://www.itu.int/rec/T-REC-H.265

[9] S. E. Anderson, "Bit Twiddling Hacks," Stanford University, 2005. http://graphics.stanford.edu/~seander/bithacks.html

[10] C.-M. Fu, E. Alshina, A. Alshin, Y. Huang, C. Chen, C. Tsai, C. Hsu, S. Lei, J. Park, and W.-J. Han, "Sample Adaptive Offset in the HEVC Standard," *IEEE Trans. Circuits & Syst. for Video Technology*, vol. 22, no. 12, pp. 1755-1764, December 2012.

[11] C.-Y. Tsai, C.-Y. Chen, T. Yamakage, I. S. Chong, Y.-W. Huang, C.-M. Fu, T. Itoh, T. Watanabe, T. Chujoh, M. Karczewicz, and S.-M. Lei, "Adaptive Loop Filtering for Video Coding," *IEEE J. Selected Topics in Signal Process.*, vol. 7, no. 6, pp. 934-945, December 2013.

The invention claimed is:

1. An apparatus for varying a coding quantization parameter across a picture, configured to
   determine a dispersion of a statistical sample value distribution of a high-pass filtered version of a predetermined block of the picture using an $L^p$ norm with $p \geq 1$, and
   determine the coding quantization parameter for the predetermined block depending on the dispersion,
   wherein the apparatus is configured to, in determining the dispersion, apply the $L^p$ norm to high-pass filtered sample values of the high-pass filtered version within the predetermined block to measure the dispersion, and, in determining the coding quantization parameter, subject the $L^p$ norm or a squared version thereof to a logarithmization to determine the coding quantization parameter.

2. The apparatus according to claim 1, configured to, in determining the dispersion,
   subject the predetermined block to high-pass filtering to obtain high-pass filtered sample values of the predetermined block, and
   determine the dispersion of the statistical sample value distribution of the high-pass filtered version of the predetermined block by computing a dispersion of a statistical distribution of the high-pass filtered sample values.

3. The apparatus according to claim 2, configured to, in subjecting the predetermined block to high-pass filtering,
   compute, for each sample value of the predetermined block, a sum of the respective sample value times a first weight, and sample values spatially neighboring the respective sample value times second weights, wherein the first weight and the second weights differ in sign, wherein the high-pass filtered sample value collocated to the respective sample value of the predetermined block is the sum or depends on the sum.

4. The apparatus according to claim 1, configured to, in determining the coding quantization parameter,
   subject the dispersion to logarithmization.

5. The apparatus according to claim 1, configured to
   determine a further dispersion of a statistical sample value distribution of a low-pass filtered version of the predetermined block, and
   perform the determining of the coding quantization parameter for the predetermined block further depending on the further dispersion.

6. The apparatus according to claim 5, configured to, in determining the further dispersion,
   subject the predetermined block to low-pass filtering to acquire low-pass filtered sample values of the predetermined block, and
   determine the further dispersion by computing a dispersion of a statistical distribution of the low-pass filtered sample values.

7. The apparatus according to claim 6, configured to, in subjecting the predetermined block to low-pass filtering,
   form, for each sample value of the predetermined block, a sum of the respective sample value times a third weight, and sample values spatially neighboring the respective sample value times fourth weights, wherein the third weight and the fourth weights are equal in sign, wherein the low-pass filtered sample value collocated to the respective sample value of the predetermined block is the sum or depends on the sum.

8. The apparatus according to claim 5, configured to
   determine the coding quantization parameter for the predetermined block by computing a weighted sum of a first addend which depends on the dispersion and a second addend which depends on the further dispersion.

9. The apparatus according to claim 1, configured to perform the determination of the dispersion and the determination of the coding quantization parameter for a plurality of blocks the picture is composed of, so as to acquire for each of the plurality of blocks a coding quantization parameter associated with the respective block.

10. An encoder for encoding a picture into a data stream, comprising:
    the apparatus for varying the coding quantization parameter across the picture according to claim 1; and
    an encoding stage configured to encode the picture into the data stream using the coding quantization parameter.

11. The encoder according to claim 10, configured to encode the coding quantization parameter into the data stream.

12. The encoder according to claim 10, configured to subject the coding quantization parameter to two-dimensional median filtering.

13. The encoder according to claim 10, wherein the encoding stage is configured to acquire a residual signal using the picture and using predictive coding and encode into the data stream the residual signal using the coding quantization parameter.

14. The encoder according to claim 10, wherein the encoding stage is configured to encode the picture into the data stream using predictive coding to acquire a residual signal, quantize the residual signal using the coding quantization parameter, and encode the quantized residual signal into the data stream.

15. The encoder according to claim 10, wherein the encoding stage is configured to, in encoding the picture into the data stream, adapt a Lagrangian rate-distortion parameter depending on the coding quantization parameter.

16. The encoder according to claim 10, wherein the apparatus is configured to perform a variation of the coding quantization parameter based on an original version of the picture.

17. The encoder according to claim 10, wherein the encoding stage supports one or more of
- block-wise switching between transform-domain and spatial-domain prediction residual coding;
- block-wise prediction residual coding at block sizes comprising multiple-of-four horizontal and vertical dimensions; and
- determining and encoding in-loop filter coefficients into the data stream.

18. The encoder according to claim 10, wherein the apparatus is configured to encode the coding quantization parameter into the data stream in logarithmic domain and the encoding stage is configured to, in encoding the picture using the coding quantization parameter, apply the coding quantization parameter in a manner where the coding quantization parameter acts as a divisor for a signal to be quantized prior to quantization in non-logarithmic domain.

19. Data stream stored on a non-transitory computer-readable medium, the date stream having a picture encoded thereinto by the encoder according to claim 10.

20. A method for varying a coding quantization parameter across a picture, comprising:
- determining a dispersion of a statistical sample value distribution of a high-pass filtered version of a predetermined block of the picture using an $L^p$ norm with $p \geq 1$; and
- determining the coding quantization parameter for the predetermined block depending on the dispersion,
- wherein the determining the dispersion comprises applying the $L^p$ norm to high-pass filtered sample values of the high-pass filtered version within the predetermined block to measure the dispersion, and the determining the coding quantization parameter comprises subjecting the $L^p$ norm or a squared version thereof to a logarithmization to determine the coding quantization parameter.

* * * * *